United States Patent
Burnette et al.

(10) Patent No.: US 12,534,020 B2
(45) Date of Patent: Jan. 27, 2026

(54) SENSOR ASSEMBLY WITH LIDAR FOR AUTONOMOUS VEHICLES

(71) Applicant: Kodiak Robotics, Inc., Mountain View, CA (US)

(72) Inventors: Donald Burnette, Mountain View, CA (US); Court Hinricher, Mountain View, CA (US); Jay Kuvelker, Mountain View, CA (US); Andreas Wendel, Mountain View, CA (US); John Zinn, Mountain View, CA (US); Laura Shane, Mountain View, CA (US)

(73) Assignee: Kodiak Robotics, Inc., Mountain View, CA (US)

( * ) Notice: Subject to any disclaimer, the term of this patent is extended or adjusted under 35 U.S.C. 154(b) by 0 days.

(21) Appl. No.: 17/977,507

(22) Filed: Oct. 31, 2022

(65) Prior Publication Data

US 2023/0053265 A1 Feb. 16, 2023

Related U.S. Application Data

(63) Continuation of application No. 17/435,368, filed as application No. PCT/US2020/020450 on Feb. 28, 2020.

(Continued)

(51) Int. Cl.
*B60R 1/12* (2006.01)
*B60R 1/06* (2006.01)
(Continued)

(52) U.S. Cl.
CPC ............ *B60R 11/04* (2013.01); *B60R 1/0605* (2013.01); *B60R 1/12* (2013.01); *G01S 13/865* (2013.01);
(Continued)

(58) Field of Classification Search
CPC ......... B60R 11/04; B60R 1/0605; B60R 1/12; B60R 2001/1223; B60R 2001/1253;
(Continued)

(56) References Cited

U.S. PATENT DOCUMENTS

| 7,168,818 B1 | 1/2007 | Schnell |
| 9,555,740 B1 | 1/2017 | Zhu et al. |

(Continued)

FOREIGN PATENT DOCUMENTS

| CN | 106060456 A | 10/2016 |
| CN | 108473092 A | 8/2018 |

(Continued)

OTHER PUBLICATIONS

U.S. Appl. No. 17/977,475, filed Oct. 31, 2022.

(Continued)

*Primary Examiner* — John R Schnurr
(74) *Attorney, Agent, or Firm* — Michele V. Frank; Venable LLP

(57) ABSTRACT

A sensor assembly for autonomous vehicles includes a side mirror assembly configured to mount to a vehicle. The side mirror assembly includes a first camera having a field of view in a direction opposite a direction of forward travel of the vehicle; a second camera having a field of view in the direction of forward travel of the vehicle; and a third camera having a field of view in a direction substantially perpendicular to the direction of forward travel of the vehicle. The first camera, the second camera, and the third camera are oriented to provide, in combination with a fourth camera configured to be mounted on a roof of the vehicle, an uninterrupted camera field of view from the direction of forward travel of the vehicle to a direction opposite the direction of forward travel of the vehicle.

28 Claims, 36 Drawing Sheets

Related U.S. Application Data

(60) Provisional application No. 62/812,779, filed on Mar. 1, 2019.

(51) Int. Cl.
    *B60R 11/04*     (2006.01)
    *G01S 13/86*     (2006.01)
    *G01S 13/931*     (2020.01)
    *G01S 17/86*     (2020.01)
    *G01S 17/931*     (2020.01)
    *G03B 37/04*     (2021.01)
    *H04N 23/90*     (2023.01)
    *B60R 11/00*     (2006.01)

(52) U.S. Cl.
    CPC .......... *G01S 13/867* (2013.01); *G01S 13/931* (2013.01); *G01S 17/86* (2020.01); *G01S 17/931* (2020.01); *G03B 37/04* (2013.01); *H04N 23/90* (2023.01); *B60R 2001/1223* (2013.01); *B60R 2001/1253* (2013.01); *B60R 2011/004* (2013.01)

(58) Field of Classification Search
    CPC ............. B60R 2011/004; G01S 13/865; G01S 13/867; G01S 13/931; G01S 17/86; G01S 17/931; G01S 17/32; G01S 13/343; G01S 2013/9315; G01S 2013/9318; G01S 2013/93185; G01S 2013/9319; G01S 2013/93274; G01S 17/87; G03B 37/04; H04N 23/90
    See application file for complete search history.

(56) References Cited

U.S. PATENT DOCUMENTS

| | | | |
|---|---|---|---|
| 9,568,608 B2 | 2/2017 | Ono et al. | |
| 10,699,376 B1 | 6/2020 | Kwok | |
| 2002/0039064 A1 | 4/2002 | Yamada | |
| 2005/0257975 A1 | 11/2005 | Cavin | |
| 2007/0234500 A1 | 10/2007 | Holmes | |
| 2009/0009604 A1 | 1/2009 | Kanaoka et al. | |
| 2010/0079883 A1* | 4/2010 | Englander | B60R 11/04 359/872 |
| 2014/0204215 A1 | 7/2014 | Kriel et al. | |
| 2016/0148062 A1* | 5/2016 | Fürsich | G06V 20/56 348/36 |
| 2016/0165211 A1 | 6/2016 | Balasubramanian | |
| 2016/0288713 A1* | 10/2016 | Hoyda | B60K 35/00 |
| 2016/0379411 A1 | 12/2016 | Harbach et al. | |
| 2017/0210297 A1* | 7/2017 | Kim | G01S 17/931 |
| 2017/0343799 A1 | 11/2017 | Ito et al. | |
| 2018/0032822 A1* | 2/2018 | Frank | H04N 13/20 |
| 2018/0032824 A1 | 2/2018 | Yamamoto | |
| 2018/0188732 A1* | 7/2018 | Yoo | B60R 1/12 |
| 2018/0267558 A1 | 9/2018 | Tiwari et al. | |
| 2018/0356214 A1 | 12/2018 | Kozak et al. | |
| 2018/0356527 A1 | 12/2018 | Kozak et al. | |
| 2018/0372875 A1 | 12/2018 | Juelsgaard et al. | |
| 2019/0204845 A1* | 7/2019 | Grossman | G01S 17/931 |
| 2019/0235504 A1* | 8/2019 | Carter | G06T 7/73 |
| 2019/0331764 A1 | 10/2019 | Abari et al. | |
| 2020/0099865 A1 | 3/2020 | Kodama | |
| 2020/0238914 A1* | 7/2020 | Almahmoud | B60R 1/06 |
| 2021/0122293 A1 | 4/2021 | Hayashida et al. | |

FOREIGN PATENT DOCUMENTS

| | | |
|---|---|---|
| DE | 10337991 A1 | 3/2005 |
| DE | 10 2015 226 502 A1 | 6/2017 |
| DE | 102017114706 A1 | 7/2018 |
| JP | 2002172978 A | 6/2002 |
| JP | 2010095185 A | 4/2010 |
| WO | 2004062953 A2 | 7/2004 |
| WO | 2010052521 A1 | 5/2010 |
| WO | 2014189166 A1 | 11/2014 |
| WO | 2017177205 A1 | 10/2017 |
| WO | 2017196165 A1 | 11/2017 |
| WO | 2018/170074 A1 | 9/2018 |

OTHER PUBLICATIONS

U.S. Appl. No. 17/977,498, filed Oct. 31, 2022.
U.S. Appl. No. 17/977,511, filed Oct. 31, 2022.
U.S. Appl. No. 17/977,520, filed Oct. 31, 2022.
U.S. Appl. No. 17/977,525, filed Oct. 31, 2022.
U.S. Appl. No. 17/977,533, filed Oct. 31, 2022.
U.S. Appl. No. 17/977,540, filed Oct. 31, 2022.
U.S. Appl. No. 17/977,549, filed Oct. 31, 2022.
U.S. Appl. No. 17/977,561, filed Oct. 31, 2022.
U.S. Appl. No. 17/977,569, filed Oct. 31, 2022.
U.S. Appl. No. 17/977,572, filed Oct. 31, 2022.
U.S. Appl. No. 17/977,586, filed Oct. 31, 2022.
U.S. Appl. No. 17/980,249, filed Nov. 3, 2022.
U.S. Appl. No. 17/980,242, filed Nov. 3, 2022.
European Search Report for European Application No. 20766668.6 dated Nov. 16, 2022.
Office Action dated Feb. 23, 2023, directed to Canadian Patent Application No. 3,129,866; 4 pages.
International Search Report and Written Opinion issued in related International Patent Application No. PCT/US2020/020450 dated May 7, 2020.
Non-Final Rejection dated Aug. 14, 2023, directed to U.S. Appl. No. 17/435,368; 14 pages.
Non-Final Rejection dated Sep. 11, 2023, directed to U.S. Appl. No. 17/977,475; 10 pages.
Non-Final Rejection dated Sep. 7, 2023, directed to U.S. Appl. No. 17/977,498; 12 pages.
Non-Final Rejection dated Oct. 17, 2023, directed to U.S. Appl. No. 17/977,511; 13 pages.
Non-Final Rejection dated Sep. 27, 2023, directed to U.S. Appl. No. 17/977,520; 13 pages.
Non-Final Rejection dated Sep. 20, 2023, directed to U.S. Appl. No. 17/977,525; 14 pages.
Non-Final Rejection dated Sep. 27, 2023, directed to U.S. Appl. No. 17/977,533; 14 pages.
Non-Final Rejection dated Sep. 27, 2023, directed to U.S. Appl. No. 17/977,540; 14 pages.
Non-Final Rejection dated Sep. 7, 2023, directed to U.S. Appl. No. 17/977,549; 16 pages.
Non-Final Rejection dated Sep. 7, 2023, directed to U.S. Appl. No. 17/977,561; 14 pages.
Non-Final Rejection dated Sep. 20, 2023, directed to U.S. Appl. No. 17/977,569; 14 pages.
Non-Final Rejection dated Sep. 20, 2023, directed to U.S. Appl. No. 17/977,572; 14 pages.
Non-Final Rejection dated Sep. 11, 2023, directed to U.S. Appl. No. 17/977,586; 14 pages.
Non-Final Rejection dated Oct. 20, 2023, directed to U.S. Appl. No. 17/980,249; 17 pages.
Non-Final Rejection dated Oct. 17, 2023, directed to U.S. Appl. No. 17/980,242; 17 pages.
Notification of the First Office Action dated Aug. 17, 2023, directed to CN Application No. 202080018022.4; 18 pages.
Communication pursuant to Article 94(3) EPC dated Jul. 11, 2023, directed to EP Application No. 20 766 668.6; 5 pages.
Final Rejection dated Jan. 12, 2024, directed to U.S. Appl. No. 17/435,368; 17 pages.
Final Rejection dated Jan. 16, 2024, directed to U.S. Appl. No. 17/977,475; 12 pages.
Final Rejection dated Jan. 25, 2024, directed to U.S. Appl. No. 17/977,498; 13 pages.
Final Rejection dated Jan. 16, 2024, directed to U.S. Appl. No. 17/977,511; 14 pages.
Final Rejection dated Jan. 25, 2024, directed to U.S. Appl. No. 17/977,520; 14 pages.

(56) References Cited

OTHER PUBLICATIONS

Notice of Allowance dated Jan. 26, 2024, directed to U.S. Appl. No. 17/977,525; 8 pages.
Final Rejection dated Jan. 24, 2024, directed to U.S. Appl. No. 17/977,533; 15 pages.
Notice of Allowance dated Jan. 29, 2024, directed to U.S. Appl. No. 17/977,540; 8 pages.
Final Rejection dated Jan. 24, 2024, directed to U.S. Appl. No. 17/977,549; 18 pages.
Final Rejection dated Jan. 24, 2024, directed to U.S. Appl. No. 17/977,561; 15 pages.
Final Rejection dated Jan. 11, 2024, directed to U.S. Appl. No. 17/977,569; 14 pages.
Final Rejection dated Jan. 11, 2024, directed to U.S. Appl. No. 17/977,572; 16 pages.
Final Rejection dated Jan. 24, 2024, directed to U.S. Appl. No. 17/977,586; 15 pages.
Final Rejection dated Jan. 24, 2024, directed to U.S. Appl. No. 17/980,249; 19 pages.
Final Rejection dated Jan. 24, 2024, directed to U.S. Appl. No. 17/980,242; 18 pages.
Communication pursuant to Article 94(3) dated Jan. 29, 2024, directed to EP Application No. 20 766 668.6; 4 pages.
Notification of Second Office Action dated Feb. 21, 2024, directed to CN Patent Application No. 202080018022; 13 pages.
Office Action dated Mar. 26, 2024, directed to CA Patent Application No. 3,129,866; 4 pages.
Notice of Allowance dated Mar. 13, 2024, directed to U.S. Appl. No. 17/977,540; 8 pages.
Notice of Allowance dated Mar. 20, 2024, directed to U.S. Appl. No. 17/977,525; 8 pages.
Notice of Allowance dated Mar. 26, 2024, directed to U.S. Appl. No. 17/435,368; 9 pages.
Advisory Action dated Mar. 26, 2024, directed to U.S. Appl. No. 17/977,475; 4 pages.
Advisory Action dated Mar. 20, 2024, directed to U.S. Appl. No. 17/977,511; 4 pages.
Advisory Action dated Mar. 21, 2024, directed to U.S. Appl. No. 17/977,569; 4 pages.
Advisory Action dated Mar. 20, 2024, directed to U.S. Appl. No. 17/977,572; 4 pages.
Notice of Allowance dated Apr. 30, 2024, directed to U.S. Appl. No. 17/977,569; 8 pages.
Notice of Allowance dated May 15, 2024, directed to U.S. Appl. No. 17/977,572; 8 pages.
Non-Final Rejection dated May 30, 2024, directed to U.S. Appl. No. 17/977,498; 14 pages.
Non-Final Rejection dated May 30, 2024, directed to U.S. Appl. No. 17/977,561; 15 pages.
Notice of Allowance dated Jun. 5, 2024, directed to U.S. Appl. No. 17/977,533; 8 pages.
Notice of Allowance dated Jun. 7, 2024, directed to U.S. Appl. No. 17/977,475; 8 pages.
Notice of Allowance dated Jun. 12, 2024, directed to U.S. Appl. No. 17/977,511; 8 pages.
Non-Final Rejection dated Jun. 12, 2024, directed to U.S. Appl. No. 17/977,520; 13 pages.
Non-Final Rejection dated Jun. 12, 2024, directed to U.S. Appl. No. 17/977,549; 17 pages.
Final Rejection dated Sep. 11, 2024, directed to U.S. Appl. No. 17/977,498; 6 pages.
Final Rejection dated Sep. 11, 2024, directed to U.S. Appl. No. 17/977,561; 17 pages.
Final Rejection dated Oct. 1, 2024, directed to U.S. Appl. No. 17/980,249; 24 pages.
Final Rejection dated Oct. 1, 2024, directed to U.S. Appl. No. 17/977,520; 15 pages.
Final Rejection dated Oct. 22, 2024, directed to U.S. Appl. No. 17/980,242; 26 pages.
Rejection Decision dated Sep. 27, 2024, directed to Chinese Patent Application No. 202080018022.4; 13 pages.
Final Rejection dated Dec. 9, 2024, directed to U.S. Appl. No. 17/977,549; 19 pages.
Examination Report No. 1 for Standard Patent Application dated Nov. 15, 2024, directed to AU Patent Application No. 2020231338; 3 pages.
Non-Final Rejection dated Jun. 12, 2024, directed to U.S. Appl. No. 17/980,249; 22 pages.
Notice of Allowance dated Jun. 20, 2024, directed to U.S. Appl. No. 17/977,586; 9 pages.
Non-Final Rejection dated Jul. 5, 2024, directed to U.S. Appl. No. 17/980,242; 20 pages.
Notice of Allowance dated Jul. 30, 2024, directed to U.S. Appl. No. 17/977,540; 8 pages.
Notice of Allowance dated Jul. 30, 2024, directed to U.S. Appl. No. 17/435,368; 8 pages.
Advisory Action dated Nov. 19, 2024, directed to U.S. Appl. No. 17/977,498; 4 pages.
Notice of Allowance dated Jan. 23, 2025, directed to U.S. Appl. No. 17/977,561; 8 pages.
Notice of Allowance dated Jan. 29, 2025, directed to U.S. Appl. No. 17/977,525; 8 pages.
Notice of Allowance dated Feb. 11, 2025, directed to U.S. Appl. No. 17/435,368; 8 pages.
Notice of Allowance dated Feb. 12, 2025, directed to U.S. Appl. No. 17/977,498; 8 pages.
Non-Final Rejection dated Feb. 20, 2025, directed to U.S. Appl. No. 17/980,249; 27 pages.
Office Action mailed Feb. 12, 2025, directed to Canadian Patent Application No. 3,129, 866; 5 pages.
Notice of Allowance dated Feb. 27, 2025, directed to U.S. Appl. No. 17/980,242; 9 pages.
Notice of Allowance dated Mar. 4, 2025, directed to U.S. Appl. No. 17/977,520; 10 pages.
Rejection Decision mailed Feb. 9, 2025, directed to Chinese Patent Application No. 202080018022.4; 19 pages.
Extended European Search Report dated Feb. 20, 2025, directed to EP Application No. 24214351.9; 12 pages.
Notice of Allowance dated Apr. 28, 2025, directed to U.S. Appl. No. 17/977,549; 8 pages.
Notice of Allowance dated Jun. 13, 2025, directed to U.S. Appl. No. 17/980,249; 9 pages.
Communication pursuant to Article 94(3) EPC dated Dec. 17, 2025, directed to EP Patent Application No. 24214351.9; 8 pages.

\* cited by examiner

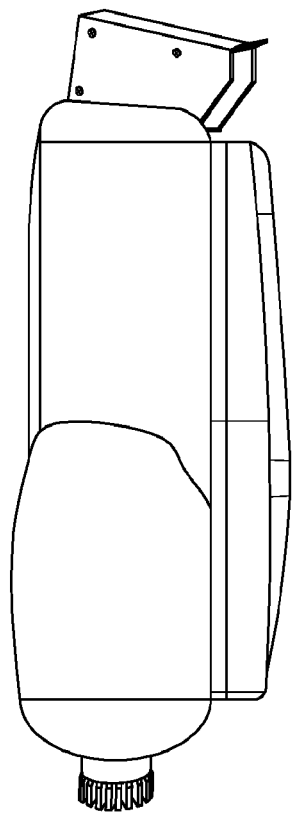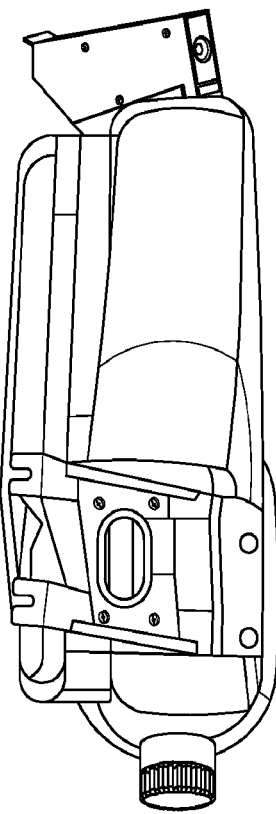
FIG. 24    FIG. 25
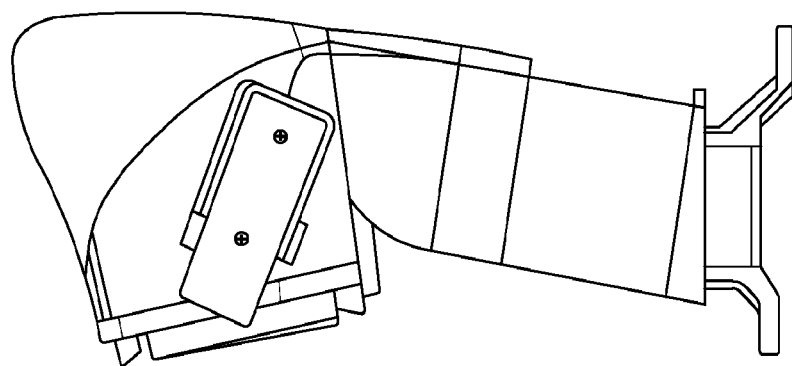
FIG. 26

SENSOR ASSEMBLY WITH LIDAR FOR AUTONOMOUS VEHICLES

CROSS REFERENCE TO RELATED APPLICATIONS

This application is related to U.S. patent application Ser. No. 17/977,475, filed Oct. 31, 2022; Ser. No. 17/977,498, filed Oct. 31, 2022; Ser. No. 17/977,511, filed Oct. 31, 2022; Ser. No. 17/977,520, filed Oct. 31, 2022; Ser. No. 17/977,525, filed Oct. 31, 2022; Ser. No. 17/977,533, filed Oct. 31, 2022; Ser. No. 17/977,540, filed Oct. 31, 2022; Ser. No. 17/977,549, filed Oct. 31, 2022; Ser. No. 17/977,561 filed Oct. 31, 2022; Ser. No. 17/977,569, filed Oct. 31, 2022; Ser. No. 17/977,572, filed Oct. 31, 2022; Ser. No. 17/977,586, filed Oct. 31, 2022; Ser. No. 17/980,249, filed Nov. 3, 2022; and Ser. No. 17/980,242, filed Nov. 3, 2022. The entire contents of each foregoing application are incorporated herein by reference.

TECHNICAL FIELD

The present disclosure relates to autonomous vehicles, and more specifically to sensor assemblies for autonomous vehicles.

BACKGROUND

The trucking industry transports a significant portion of raw materials and finished goods through roadways around the world. In America, the trucking industry is responsible for the majority of freight movement over land. Developments in technology, such as those associated with autonomous driving, have contributed to many improvements within the industry to increase productivity and safety of such operations.

SUMMARY

A sensor assembly for autonomous vehicles includes a side mirror assembly configured to mount to a vehicle. The side mirror assembly includes a first camera having a field of view in a direction opposite a direction of forward travel of the vehicle; a second camera having a field of view in the direction of forward travel of the vehicle; and a third camera having a field of view in a direction substantially perpendicular to the direction of forward travel of the vehicle. The first camera, the second camera, and the third camera are oriented to provide, in combination with a fourth camera configured to be mounted on a roof of the vehicle, an uninterrupted camera field of view from the direction of forward travel of the vehicle to a direction opposite the direction of forward travel of the vehicle.

According to one aspect, the uninterrupted camera field of view spans at least 180°. According to one aspect, the second camera and the third camera are configured to be mounted on a roof of the vehicle. According to one aspect, the sensor assembly further includes the fourth camera configured to be mounted on the roof of the vehicle, the fourth camera being oriented to have a field of view in the direction of forward travel of the vehicle.

According to one aspect, the fourth camera and the second camera are oriented such that the field of view of the fourth camera overlaps the field of view of the second camera. According to one aspect, the fourth camera and the third camera are oriented such that the field of view of the fourth camera overlaps the field of view of the third camera.

According to one aspect, the first and second cameras are narrow field of view cameras, and the third and fourth cameras are wide field of view cameras.

According to one aspect, the side mirror assembly further comprises at least one of a radar sensor and a lidar sensor. According to one aspect, the side mirror assembly further comprises a radar sensor, a lidar sensor, and an inertial measurement unit (IMU).

According to one aspect, the sensor assembly for autonomous vehicles further includes an arm assembly configured to project the side mirror assembly outward from the autonomous vehicle, wherein the autonomous vehicle is a truck, and wherein the arm assembly comprises mountings for attachment to an A-pillar of the truck. According to one aspect, the autonomous vehicle is a tractor trailer, and the camera field of view is uninterrupted horizontally outside 1 meter laterally from a point at a center of a tractor of the tractor trailer. According to one aspect, the camera field of view is co-terminus with a side of a trailer of the tractor trailer.

A sensor assembly for autonomous vehicles includes a side mirror assembly configured to mount to a vehicle. The side mirror assembly includes a first camera having a field of view in a direction opposite a direction of forward travel of the vehicle; a second camera having a field of view in the direction of forward travel of the vehicle; and a third camera having a field of view in a direction substantially perpendicular to the direction of forward travel of the vehicle. The first camera, the second camera, and the third camera are oriented to provide an uninterrupted camera field of view from the direction of forward travel of the vehicle to a direction opposite the direction of forward travel of the vehicle.

According to one aspect, the uninterrupted camera field of view spans at least 180°. According to one aspect, the first and second cameras are narrow field of view cameras, and the third camera is a wide field of view camera. According to one aspect, the third camera and the second camera are oriented such that the field of view of the third camera overlaps the field of view of the second camera by at least 5 degrees. According to one aspect, the third camera and the second camera are oriented such that the field of view of the third camera overlaps the field of view of the second camera by about 10 degrees.

According to one aspect, the first camera, the second camera, and the third camera are each disposed on an upper portion of the side mirror assembly. According to one aspect, the first camera, the second camera, and the third camera are each disposed within a volume of 8 in$^3$ on an upper portion of the side mirror assembly.

According to one aspect, the sensor assembly further includes a fourth camera configured to be mounted on a roof of the vehicle, the fourth camera oriented to have a field of view in the direction of forward travel of the vehicle. According to one aspect, the fourth camera is a wide field of view camera. According to one aspect, the fourth camera and the first camera are oriented such that the field of view of the fourth camera overlaps the field of view of the first camera. According to one aspect, the fourth camera and the third camera are oriented such that the field of view of the fourth camera overlaps the field of view of the third camera.

According to one aspect, the side mirror assembly further comprises at least one of a radar sensor and a lidar sensor. According to one aspect, the side mirror assembly further comprises a radar sensor, a lidar sensor, and an inertial measurement unit (IMU).

According to one aspect, sensor assembly for autonomous vehicles further includes an arm assembly configured to project the sensor assembly outward from the autonomous vehicle, wherein the autonomous vehicle is a truck, and wherein the arm assembly comprises mountings for attachment to an A-pillar of the truck. According to one aspect, the autonomous vehicle is a tractor trailer, and wherein the camera field of view is uninterrupted horizontally outside 1 meter laterally from a point at a center of a tractor of the tractor trailer. According to one aspect, the camera field of view is co-terminus with a side of a trailer of the tractor trailer. According to one aspect, the first camera is mounted with a tolerance such that the field of view of the first camera is co-terminus with a side of the autonomous vehicle when the first camera is maximally rotated away from the side of the autonomous vehicle.

A method for providing an uninterrupted camera field of view from a direction of forward travel of a vehicle to a direction opposite the direction of forward travel of the vehicle includes obtaining a field of view in the direction opposite the direction of forward travel of the vehicle; obtaining a field of view in the direction of forward travel of the vehicle; and obtaining a field of view in a direction substantially perpendicular to the direction of forward travel of the vehicle. The method further includes processing the obtained fields of view to produce an uninterrupted camera field of view from the direction of forward travel of the vehicle to the direction opposite the direction of forward travel of the vehicle. The method may further include continuously obtaining the fields of view and processing the obtained fields of view in real time to produce updated uninterrupted camera fields of view.

A method for autonomous driving includes driving by calculations that use the uninterrupted camera field of view provided by the aforementioned method.

Additional features, advantages, and embodiments of the disclosure are set forth or apparent from consideration of the following detailed description, drawings and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

FIGS. 5-1 and 5-2 are schematic illustrations of a top-down view of the combination of the field of view of the first camera, the field of view of the second camera, the field of view of the third camera, and the field of view of the fourth camera according to one aspect of the disclosure.

FIGS. 6-1 and 6-2 are schematic illustrations of the camera field of view when the first camera has been rotated away from the autonomous vehicle according to one aspect of the disclosure.

FIGS. 11-1 and 11-2 are more zoomed-in views of the schematic illustration of FIG. 10 according to one aspect of the disclosure.

FIG. 24 shows a right side elevational view illustration of a side view apparatus for an autonomous vehicle according to one aspect of the disclosure.

FIG. 25 shows a left side elevational view illustration of a side view apparatus for an autonomous vehicle according to one aspect of the disclosure.

FIG. 26 shows a top plan view illustration of a side view apparatus for an autonomous vehicle according to one aspect of the disclosure.

DETAILED DESCRIPTION

Figure 1A:
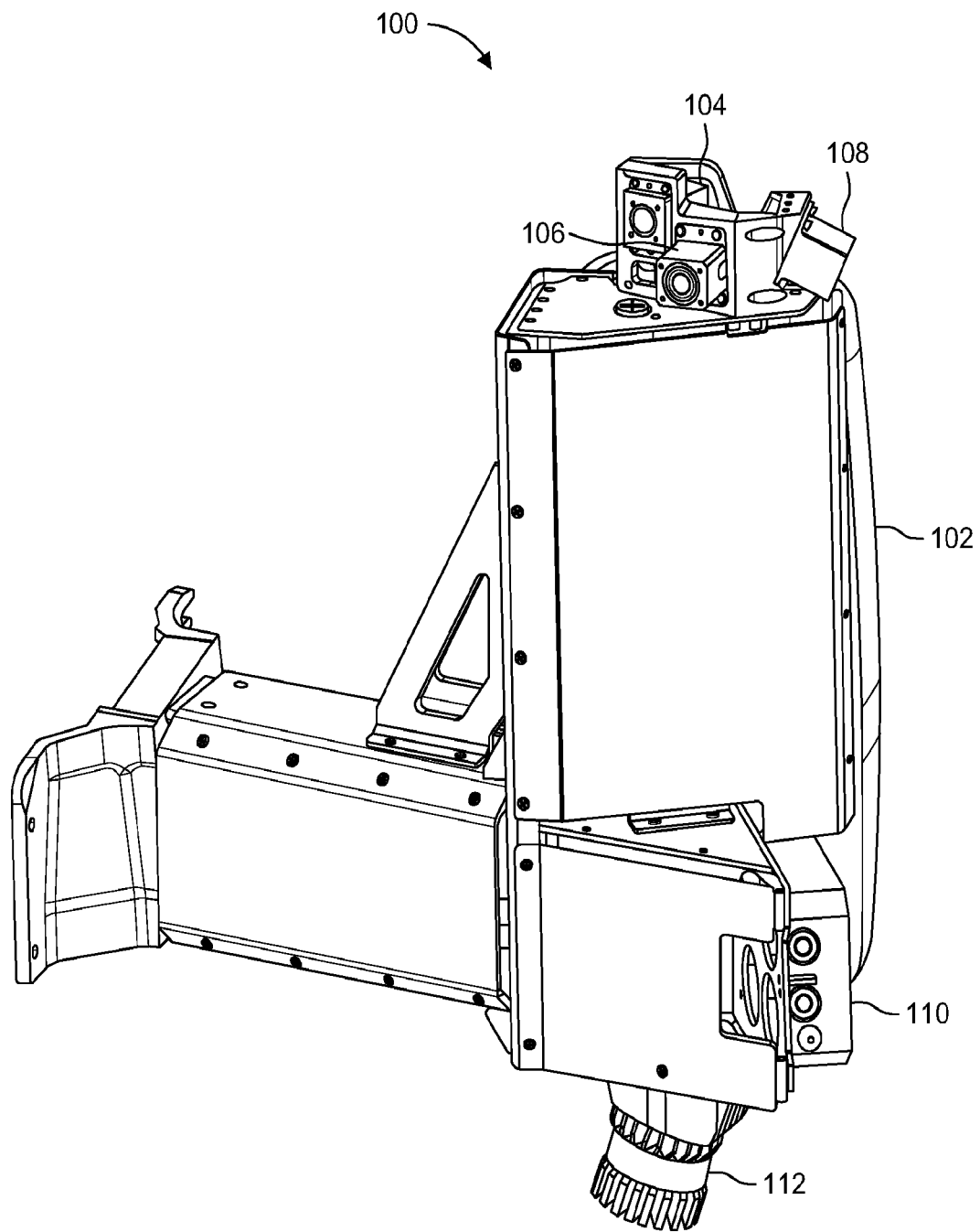
FIG. 1A is a schematic illustration of a front perspective view of the sensor assembly according to one aspect of the disclosure.

Embodiments described herein are directed to sensor assemblies for autonomous vehicles. Autonomous vehicles use a variety of sensors to monitor their surroundings. The sensors may include, for example, cameras, lidars, radars, and inertial measurement units (IMUs). The combined data from the sensors may be used by a processor to autonomously navigate the roadway in a variety of light and weather conditions.

Several sensor-related technologies have been applied towards the expanding field of autonomous vehicles. While some advancements have been directed towards personal and commercial cars and vehicles, the application of these technologies towards semi-trailer trucks poses unique challenges and constraints. First, semi-trailer trucks generally travel long distances over roadways of varying quality under high-vibration and shock force conditions. Thus, sensor systems for use thereby must be configured to withstand such vibrations and forces for prolonged periods of time. Second, as the trailer towed by the semi-trailer truck blocks a significant portion of the rearward visibility, the position of sensors relative to the vehicle is key towards minimizing and eliminating sensor blind spots. Third, the heavy cargo weights towed by such vehicles may be difficult to maneuver, accelerate, and decelerate in response to road conditions and hazards, and, as such, precise and widespread object detection is required to enable rapid and safe autonomous driving.

As such, provided herein are apparatus, systems, and kits comprising support structures and sensors, which are configured to provide greater fields of view and higher quality and more reliable data for autonomous driving. The specific sensor placement and the rigidity of the support structures enable a sufficient field of view while reducing vibrational disturbances for increased object detection rate and higher quality positional data. Further, the apparatus, systems, and kits described herein may be installed on an autonomous vehicle without requiring material modification to the autonomous vehicle, and without preventing access to the vehicle by a human driver, precluding the view of the human driver, or hindering operation of the vehicle by the human driver. Such human driver access allows for more complex loading and unloading maneuvers, precise operation in dangerous or restricted areas, and enables a safety and/or security member to remain within the vehicle, with or without operating the vehicle.

Sensors used for autonomous driving are exposed to high amounts of shock and vibration when driving on the road. Movements from these vibrations (deflections) can degrade sensor data and can be detrimental to the performance of the self-driving system. The shape of tractor and trailer makes it challenging to position sensors without the sensors having blind spots. In order for sensors to see backwards they must be cantilevered out to the sides at points wider than the trailer. However, a structure will deflect more as the length of its cantilever increases, and therefore highly rigid structures are described herein that increase the natural frequencies of the cantilevered components.

Figure 1B:
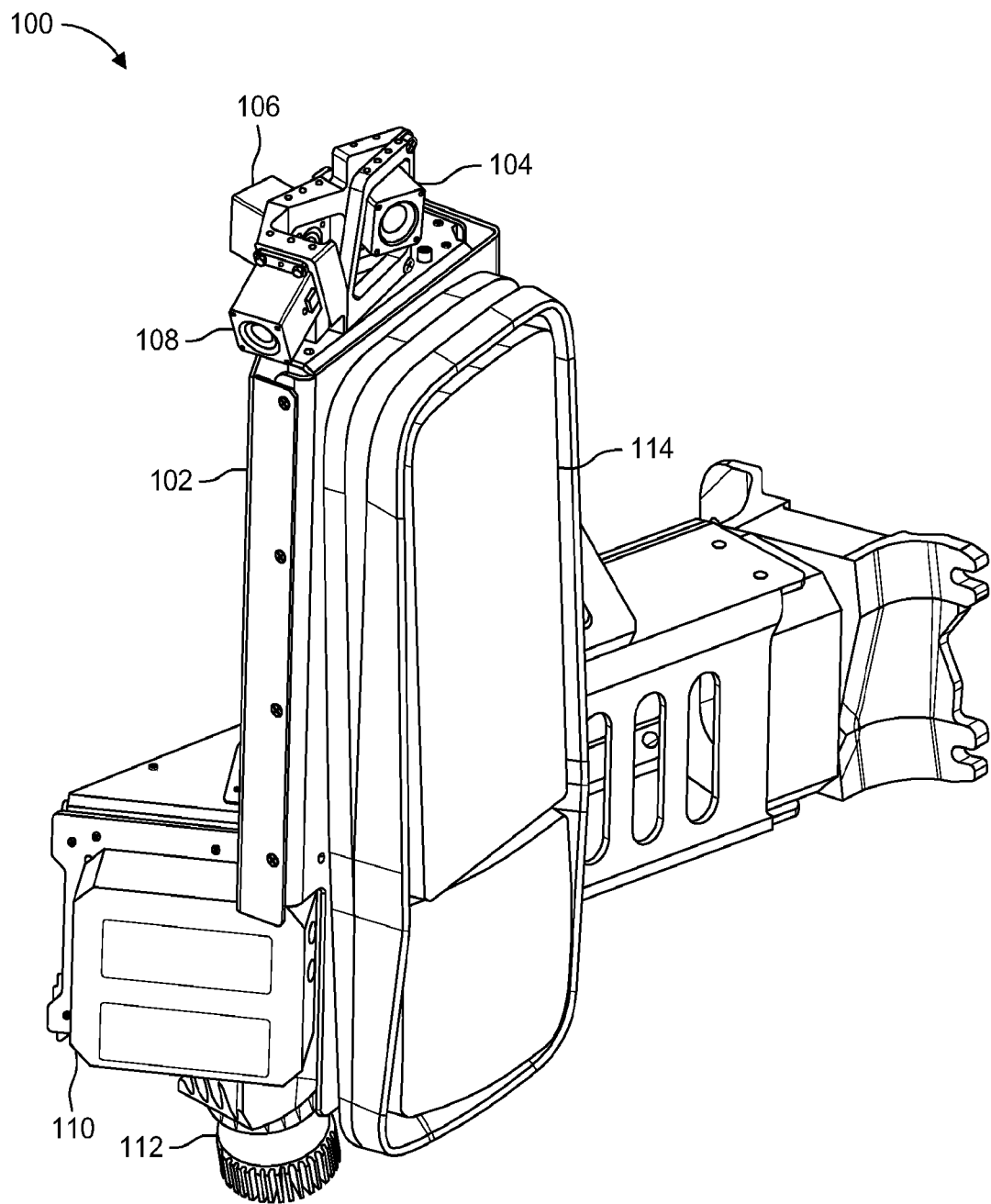
FIG. 1B is a schematic illustration of a rear perspective view of the sensor assembly according to one aspect of the disclosure.

FIGS. 1A and 1B are schematic illustrations of a sensor assembly 100 for autonomous vehicles according to one aspect of the disclosure. FIG. 1A is a schematic illustration of a front perspective view of the sensor assembly 100, and FIG. 1B is a schematic illustration of a rear perspective view of the sensor assembly 100. The sensor assembly 100 includes a side mirror assembly 102 configured to mount to a vehicle. The side mirror assembly 102 includes a first camera 104 having a field of view in a direction opposite a direction of forward travel of the vehicle. The sensor assembly 100 includes a second camera 106 having a field of view in the direction of forward travel of the vehicle. The sensor assembly 100 includes a third camera 108 having a field of view in a direction substantially perpendicular to the direction of forward travel of the vehicle. The first camera 104, the second camera 106, and the third camera 108 are oriented to provide, in combination with a fourth camera configured to be mounted on a roof of said vehicle, an uninterrupted camera field of view from the direction of forward travel of the vehicle to the direction opposite the direction of forward travel of the vehicle.

The second camera 106 and the third camera 108 may be included in the side mirror assembly 102, as shown in FIGS. 1A and 1B, or may be positioned in other locations, for example, on the roof of the autonomous vehicle.

According to one aspect, the first and second cameras 104, 106 are narrow field of view cameras, and the third camera 108 and the fourth camera are wide field of view cameras.

The term "camera field of view" is used herein to indicate a total field of view of one or more cameras. The cameras may be configured to capture two-dimensional or three-dimensional images. The term "wide field of view camera" is used herein to indicate a camera that has a field of view that is wider than a field of view of a "narrow field of view camera." According to one aspect, the wide field of view camera has a field of view greater than 90°. According to one aspect, the wide field of view camera has a field of view greater than 120°. According to one aspect, the wide field of view camera is configured to detect objects at a distance less than 200 m from the autonomous vehicle.

According to one aspect, the narrow field of view camera has a field of view less than 90°. According to one aspect, the narrow field of view camera has a field of view less than 45°. According to one aspect, the narrow field of view camera is configured to detect objects at a distance greater than 50 m from the autonomous vehicle.

According to one aspect of the disclosure, the side mirror assembly 102 includes one or more of a radar, a lidar, and an inertial measurement unit (IMU). The side mirror assembly 102 schematically illustrated in FIGS. 1A and 1B includes a radar 110 and a lidar 112. According to one aspect, the lidar 112 includes an IMU integrated therein. However, the side mirror assembly 102 may include an IMU that is independent of the other sensors, or integrated into the cameras, the radar, or an additional sensor. The side mirror assembly 102 may include a mirror 114.

The lidar 112 and radar 110 may provide different types of information than the cameras 104, 106, 108, and may be particularly useful for certain tasks or conditions. The lidar 112 may assist in tracking vehicles or objects passing or being passed by the autonomous vehicle. For example, as a car passes the autonomous vehicle, the appearance of the car may change as it is captured first from the front, then from the side, and then from behind, and therefore tracking of the car by camera may be difficult. The lidar, however, may provide a continuous signal corresponding to the car that enables the autonomous vehicle to track the car as it passes. The lidar may also be particularly useful at night, when visible light is limited, and therefore the camera signals are weaker. The lidar 112 may be configured to detect objects within a radius of about 75 m, for example. According to one aspect, the lidar 112 may be configured to detect objects within a radius of about 50 m.

The radar 110 may enable the autonomous vehicle to navigate in difficult weather and light conditions. The radar 110 may supplement the information from the cameras 104, 106, 106 and lidar 112, which may have difficulty obtaining clear images and signals in the presence of fog, rain, and snow. The radar 110 may also provide information regarding objects that are occluded in the camera and lidar data. For example, the radar 110 may detect a car in front of the autonomous vehicle, as well as a motor cycle in front of the car. In contrast, if the motor cycle is completely obscured by the car, the cameras 104, 106, 108 and lidar 112 may not detect the motorcycle.

Figure 2A:
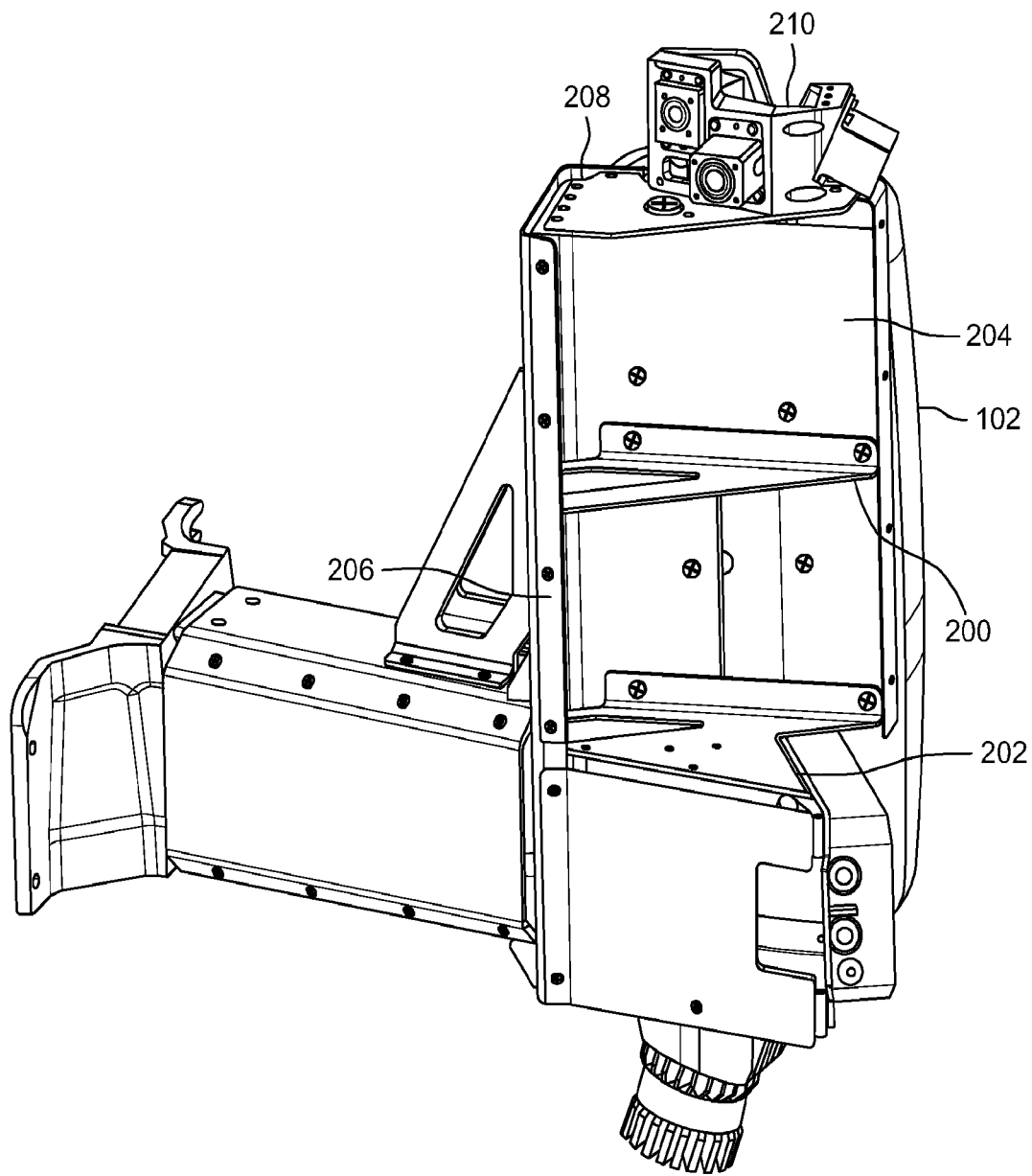
FIG. 2A is a schematic illustration of an interior of the side mirror assembly according to one aspect of the disclosure.

FIG. 2A is a schematic illustration of an interior of the side mirror assembly 102 according to one aspect of the disclosure. The side mirror assembly 102 has a sheet metal box structure, and includes a plurality of braces 200, 202 that attach to the walls 204, 206 of the box. The sheet metal box structure has a shape and is made of materials that give the system high stiffness. It is important that the side mirror assembly 102 does not have a resonant frequency at or below common frequencies generated when driving on highways, for example, 15-20 Hz. The common frequencies generated when driving are referred to herein as "environment frequencies." The shape and materials of the sheet metal box, combined with the triangular braces 200, 202 as well as epoxy used to join important components, stiffen the system such that the overall frequency of each natural mode of the system is higher than the environment frequencies. For example, the side mirror assembly 102 may have a natural frequency that is at least 1.5-2× higher than the environment frequency. The term "natural frequency" refers to the frequency of the natural modes of the side mirror assembly 102.

As shown in FIGS. 1A-2A, the first camera 104, the second camera 106, and the third camera 108 may be co-located at an upper portion of the side mirror assembly 102. In one aspect, the first camera 104, the third camera 108, and the second camera 106 are all disposed within a volume of 8 in³ on the upper portion of the side mirror assembly 102. Co-locating the three cameras on the upper portion of the side mirror assembly 102 reduces the total number of sensor-mounting locations, which reduces the time needed to build up each vehicle. Co-locating the three cameras also reduces the mechanical tolerance stack up between cameras, and provides an easily accessible location to add camera cleaning features, for example, a water jet or a compressed air nozzle. Each of the cameras may have a weight less than 100 g. According to one aspect, each of the cameras may have a weight of 70 g or less. According to one aspect, the total weight of the three cameras may be less than 200 g. Reducing the weight of the cameras reduces the torque on the side mirror assembly 102, and therefore may reduce deflection of the side mirror assembly 102.

The side mirror assembly 102 may include a camera mounting platform 208. The camera mounting platform 208 may accommodate one or more cameras, and may or may not be designed for a specific camera. This enables the cameras to be easily adjusted or replaced. The relative position and orientation of the cameras can be fixed prior to mounting the cameras on the side mirror assembly 102, for example, by mounting the cameras to a common fixture 208. Each camera may include an individual mounting fixture designed to fix the camera at a particular orientation with respect to a common fixture 210. The orientation of the camera may be adjusted by adjusting or replacing the mounting fixture, or by adjusting the design of the common fixture 210. The modularity of the cameras and the common fixture 210 enables one or more of the cameras to be quickly adjusted or replaced without requiring that the other components of the side mirror assembly 102 be repositioned or replaced.

Figure 2B:
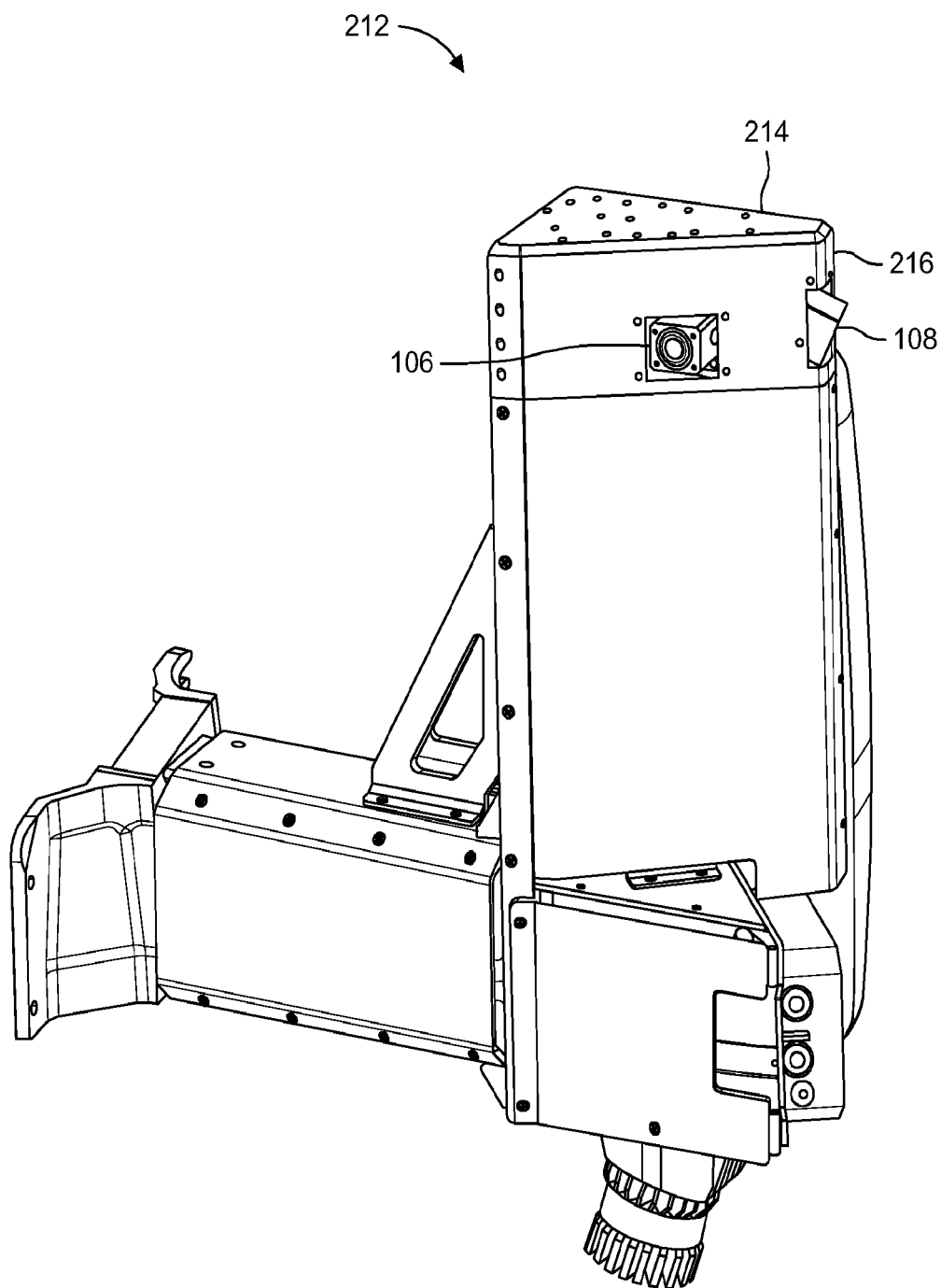
FIG. 2B is a schematic illustration of an exterior of the side mirror assembly according to one aspect of the disclosure.

FIG. 2B is a schematic illustration of an exterior of the side mirror assembly 102 according to one aspect of the disclosure. The side mirror assembly 102 includes a housing 212 positioned to cover the first camera 104, the second camera 106, and the third camera 108. The housing 212 includes a ceiling portion 214 and a side portion 216. The side portion 216 defines through-holes through which the cameras capture images. The housing 212 may prevent debris from damaging the cameras and related cables, and may also reduce solar heating of the cameras.

Figure 3:
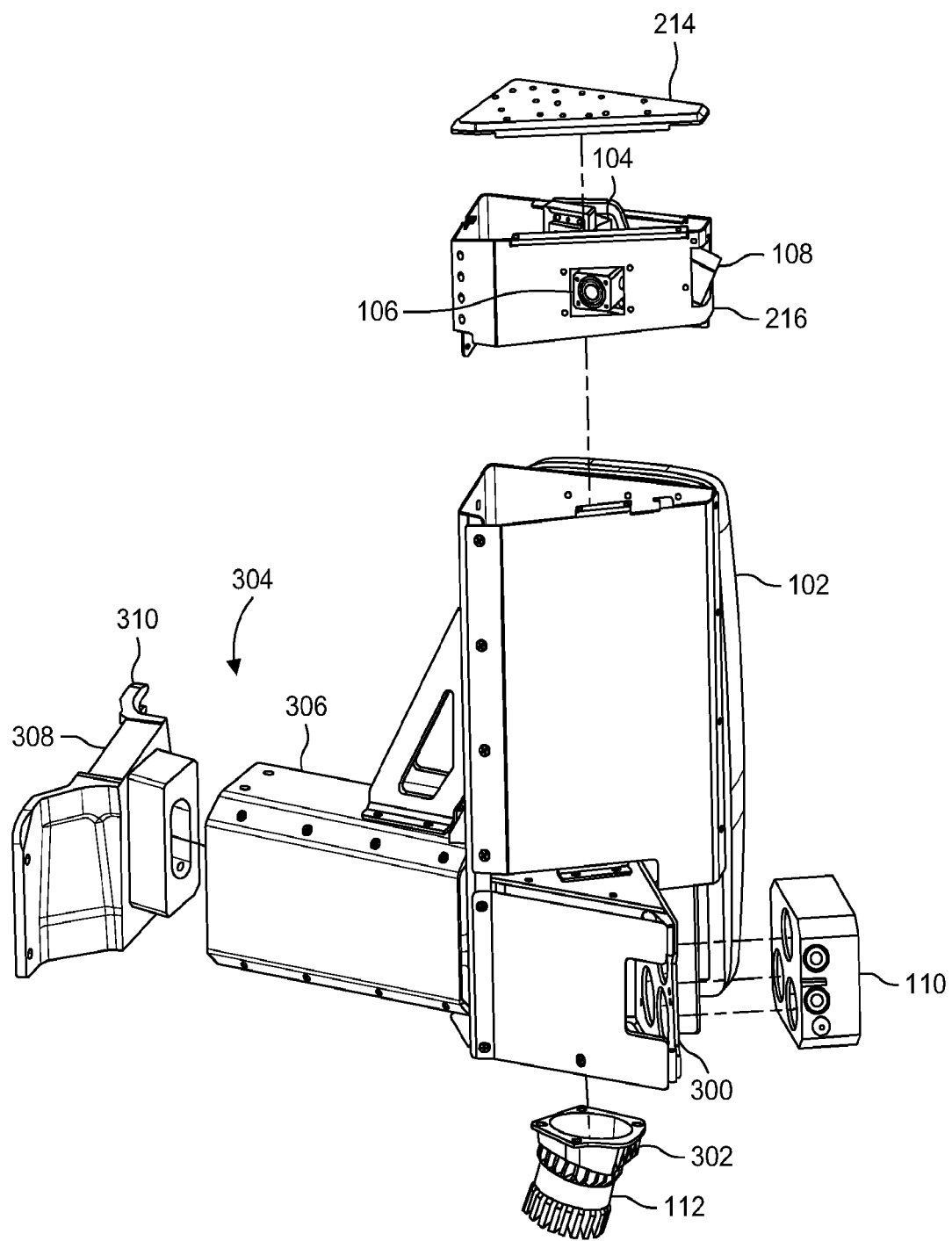
FIG. 3 is a schematic illustration of an exploded view of the side mirror assembly according to one aspect of the disclosure.

FIG. 3 is a schematic illustration of an exploded view of the side mirror assembly 102 according to one aspect of the disclosure. The first camera 104, the second camera 106, and the third camera 108 are each disposed on an upper portion of the side mirror assembly 102, and are enclosed in the ceiling portion 214 and the side portion 216 of the housing 212. The side mirror assembly 102 includes a radar 110 configured to be secured to a lower portion of the side mirror assembly 102. The radar 110 is mounted on a removable part 300, which allows its location and orientation to be easily changed by modifying that part. The side mirror assembly 102 also includes a lidar 112 configured to be secured to a lower portion of the side mirror assembly 102. The lidar 112 is mounted on a removable part 302, which allows its location and orientation to be easily changed by modifying that part.

The sensor assembly 100 further includes an arm assembly 304 configured to project the side mirror assembly 102 outward from the autonomous vehicle. The arm assembly 304 includes a beam assembly 306 configured to connect to the side mirror assembly 102, and a mounting assembly 308 configured for attachment to the autonomous vehicle. For example, the autonomous vehicle may be a truck, and the mounting assembly may include mountings, such as brackets 310, for attachment to an A-pillar of the truck. A truck's A-pillar provides a very stiff mounting point.

Figure 4A:
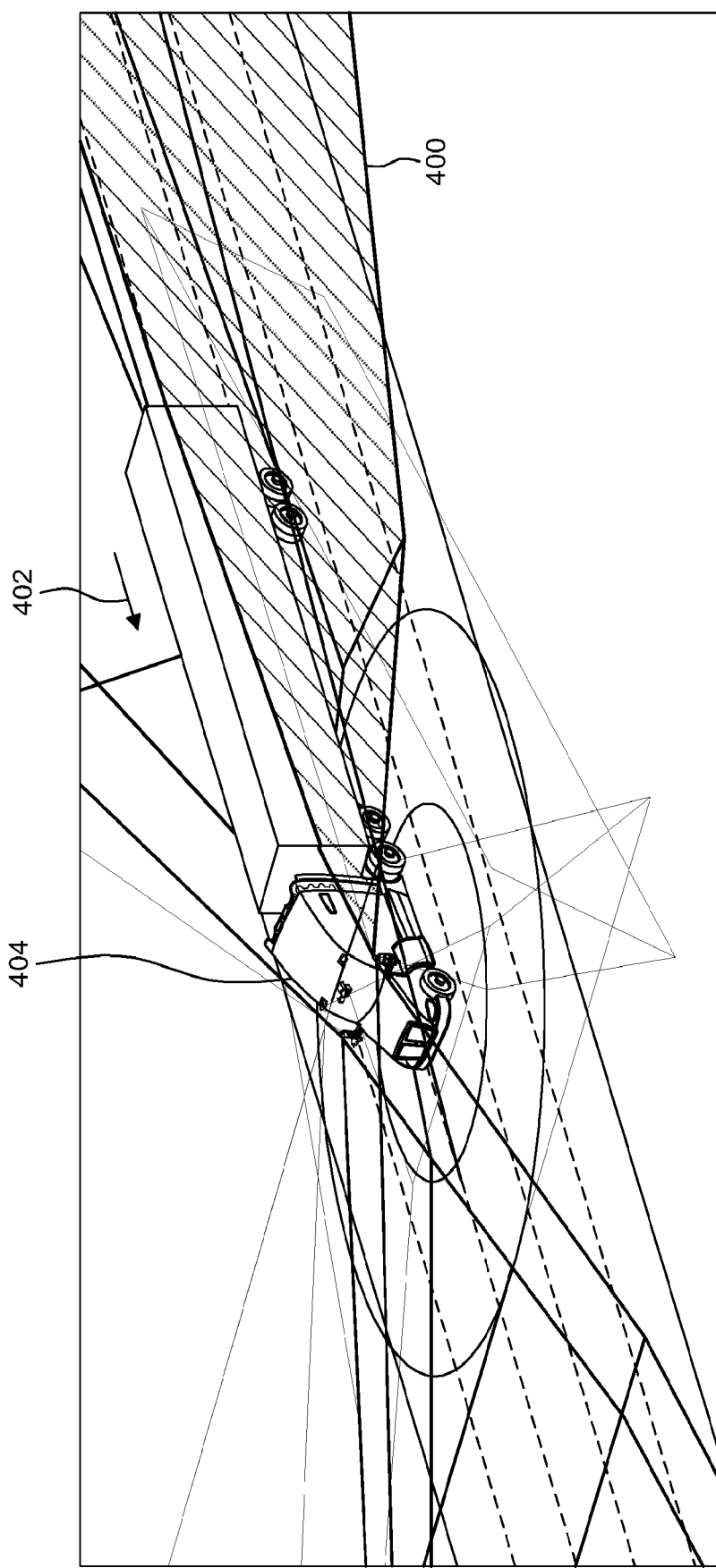
FIGS. 4A-4C are schematic illustrations of example fields of view of the first camera, the second camera, and the third camera according to one aspect of the disclosure.
Figure 4B:
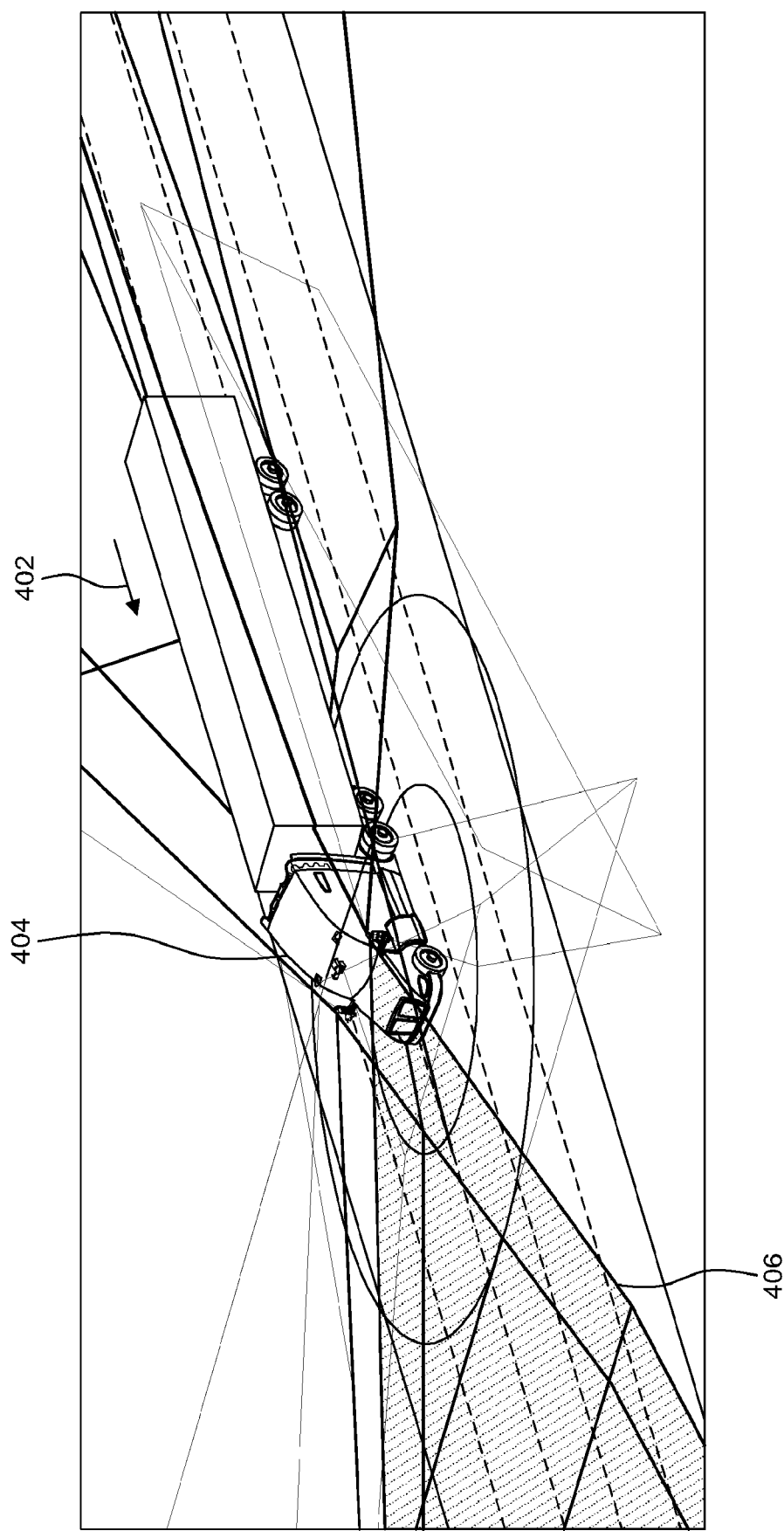
Figure 4C:
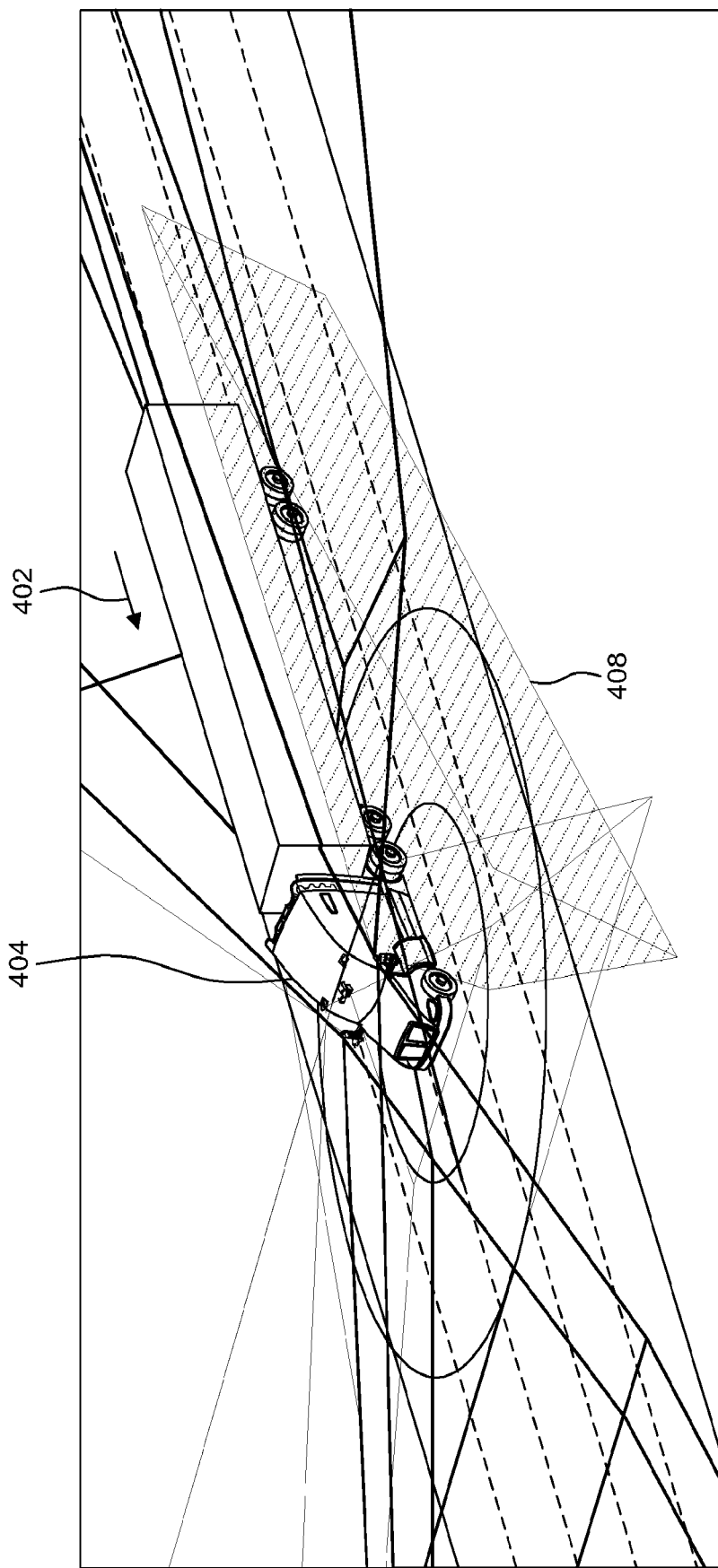

FIGS. 4A-4C are schematic illustrations of example fields of view of the first camera 104, the second camera 106, and the third camera 108 according to one aspect of the disclosure. As illustrated in FIG. 4A, the first camera 104 has a field of view 400 in a direction opposite a direction 402 of forward travel of the vehicle 404. As illustrated in FIG. 4B, the second camera 106 has a field of view 406 in the direction 402 of forward travel of the vehicle 404. As illustrated in FIG. 4C, the third camera 108 has a field of view 408 in a direction substantially perpendicular to the direction 402 of forward travel of the vehicle 404. The field of view 408 of the wide field of view may or may not be exactly perpendicular to the direction 402 of forward travel of the vehicle 404. For example, the center of the field of view 408 may be within 30° of the direction perpendicular to the direction 402 of forward travel. In one aspect, the center of the field of view 408 may be within 10° of the direction perpendicular to the direction 402 of forward travel. The first camera 104, the second camera 106, and the third camera 108 are oriented to provide an uninterrupted camera field of view from the direction of forward travel of the vehicle to a direction opposite the direction of forward travel of the vehicle.

Figure 4D:
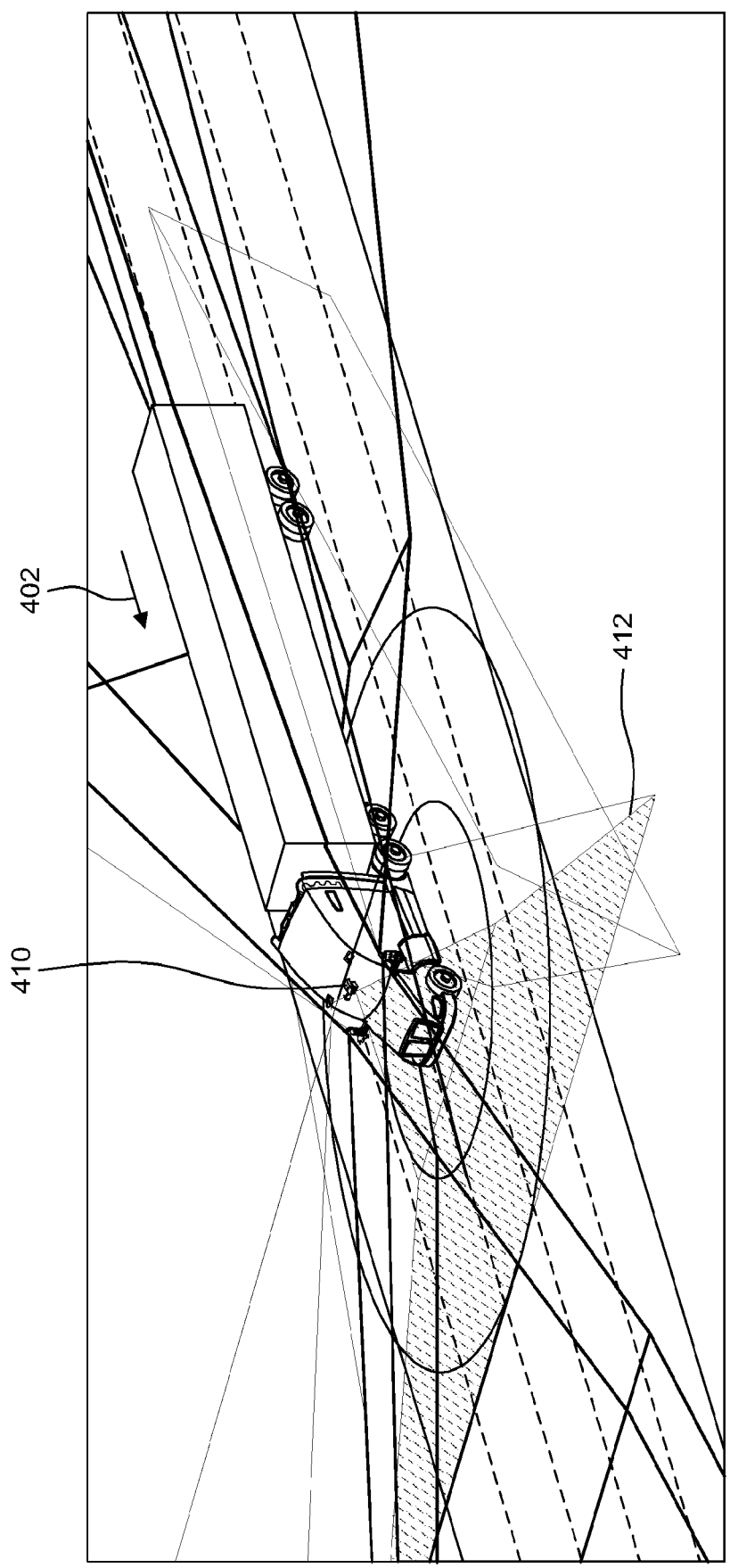
FIG. 4D is a schematic illustration of an example field of view of a fourth camera according to one aspect of the disclosure.

FIG. 4D is a schematic illustration of an example field of view of a fourth camera 410. The fourth camera 410 is configured to be mounted on the roof of the vehicle 404. As illustrated in FIG. 4D, the fourth camera 410 has a field of view 412 in the direction 402 of forward travel of the vehicle 404.

The sensor assembly 100 may include additional sensors positioned on the roof of the autonomous vehicle. For example, the sensor assembly 100 may include a second lidar positioned on the roof of the autonomous vehicle, for example, near the fourth camera 410. The second lidar may be configured to detect objects at a different distance than the lidar 112. For example, the second lidar may be configured to detect objects within a radius of about 125 m. According to one aspect, the second lidar may be configured to detect objects within a radius of about 100 m. The lidar 112 and any additional lidars may emit laser light at a frequency between 800 nm and 1600 nm, for example. The sensor assembly 100 may include an IMU on the roof of the vehicle. The IMU on the roof of the vehicle may be used for navigation, for example, the IMU may aid the autonomous vehicle in determining the direction of the vehicle's travel.

Figures 1, 4E:
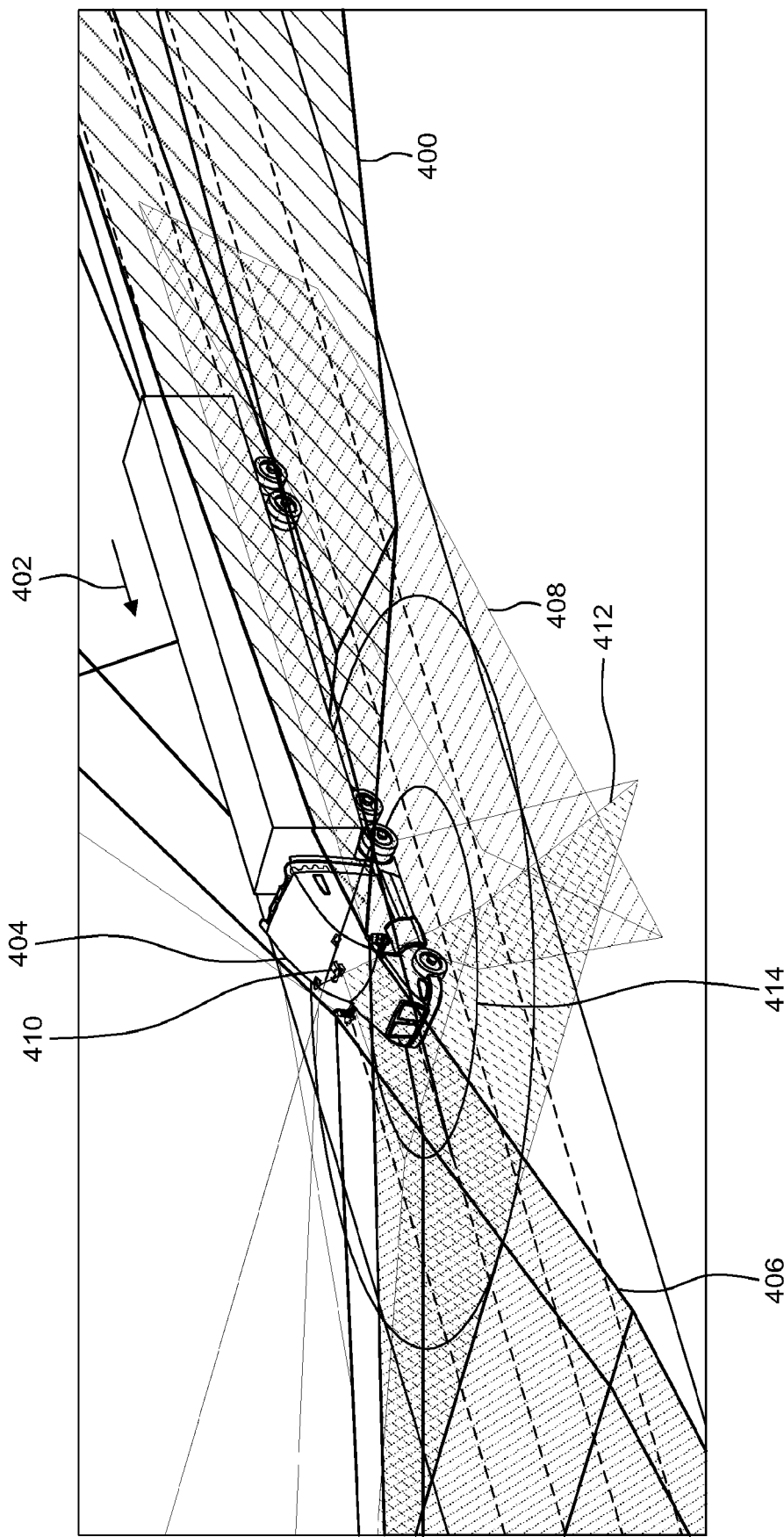
FIGS. 4E-1 and 4E-2 are schematic illustrations of example fields of view of the first camera, the second camera, and the third camera in combination with the field of view of the fourth camera according to one aspect of the disclosure.
Figures 2, 4E:
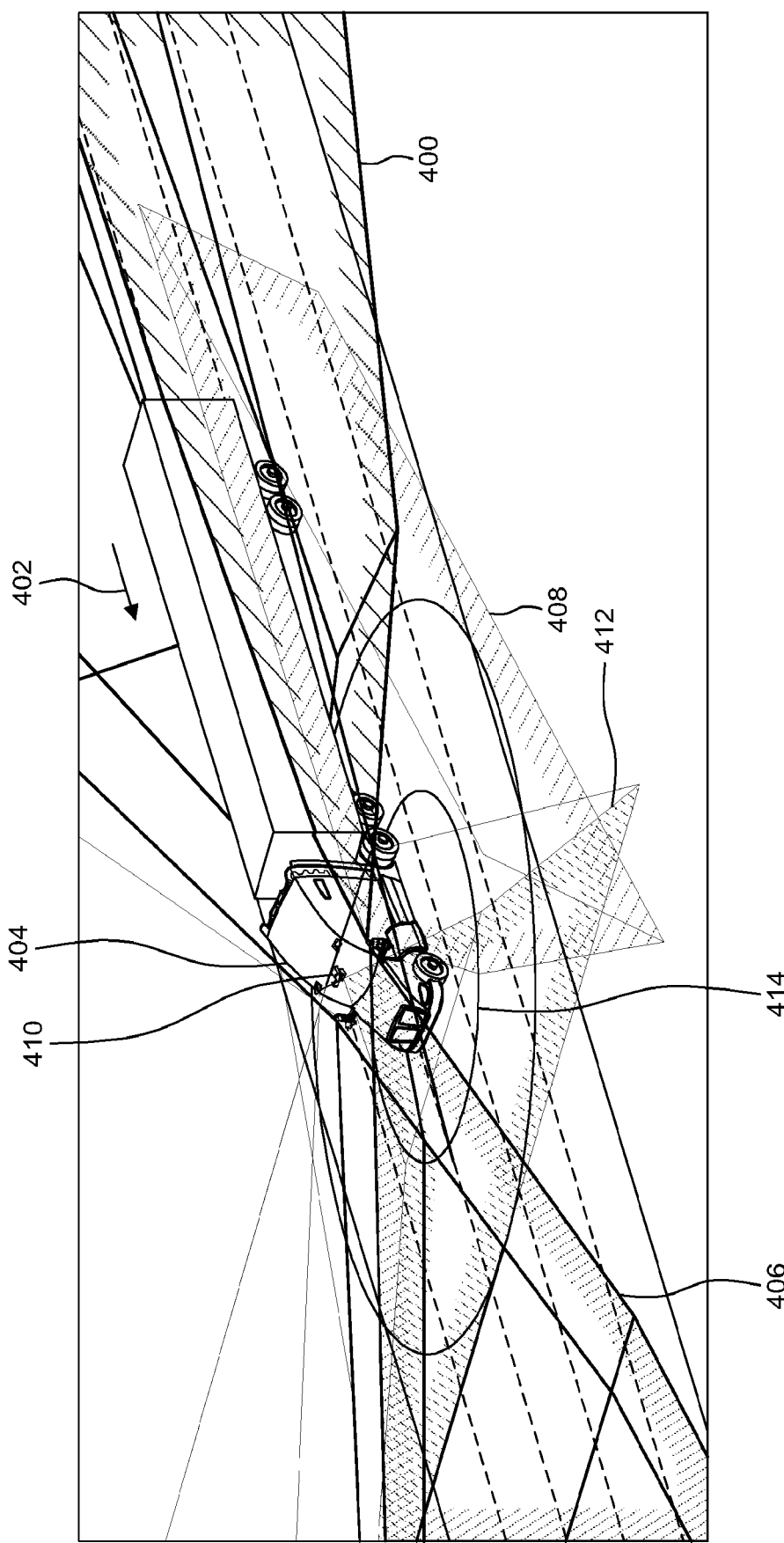

FIGS. 4E-1 and 4E-2 are schematic illustrations of example fields of view 400, 406, 408 of the first camera 104, the second camera 106, and the third camera 108 in combination with the field of view 412 of the fourth camera 410 according to one aspect of the disclosure. In FIG. 4E-1, each of the fields of view is filled with a representative pattern, highlighting the concept of an uninterrupted field of view. In FIG. 4E-2, the representative patterns are only included along the inner edges of the fields of view, enabling the boundaries of the respective fields of view to be more easily distinguished. As illustrated in FIGS. 4E-1 and 4E-2, the first camera 104, the second camera 106, and the third camera 108 are oriented to provide, in combination with the fourth camera 410, an uninterrupted camera field of view from the direction 402 of forward travel of the vehicle 404 to a direction opposite the direction 402 of forward travel of the vehicle 404.

According to one aspect, the uninterrupted camera field of view spans at least 180°. For example, in FIGS. 4E-1 and 4E-2, more than 180° of the circle 414 is within the camera field of view, without interruption. This concept is described in more detail with respect to FIGS. 5-1 and 5-2.

Although FIGS. 4A-4E-2 illustrate fields of view of four cameras, the sensor assembly may include three additional cameras on the opposite side of the autonomous vehicle from the first camera 104, the second camera 106, and the third camera 108. The three additional cameras may have three additional fields of view corresponding to the fields of view of the first camera 104, the second camera 106, and the third camera 108, as schematically illustrated in FIGS. 5-1, 5-2, 6-1, and 6-2.

Figures 1, 5:
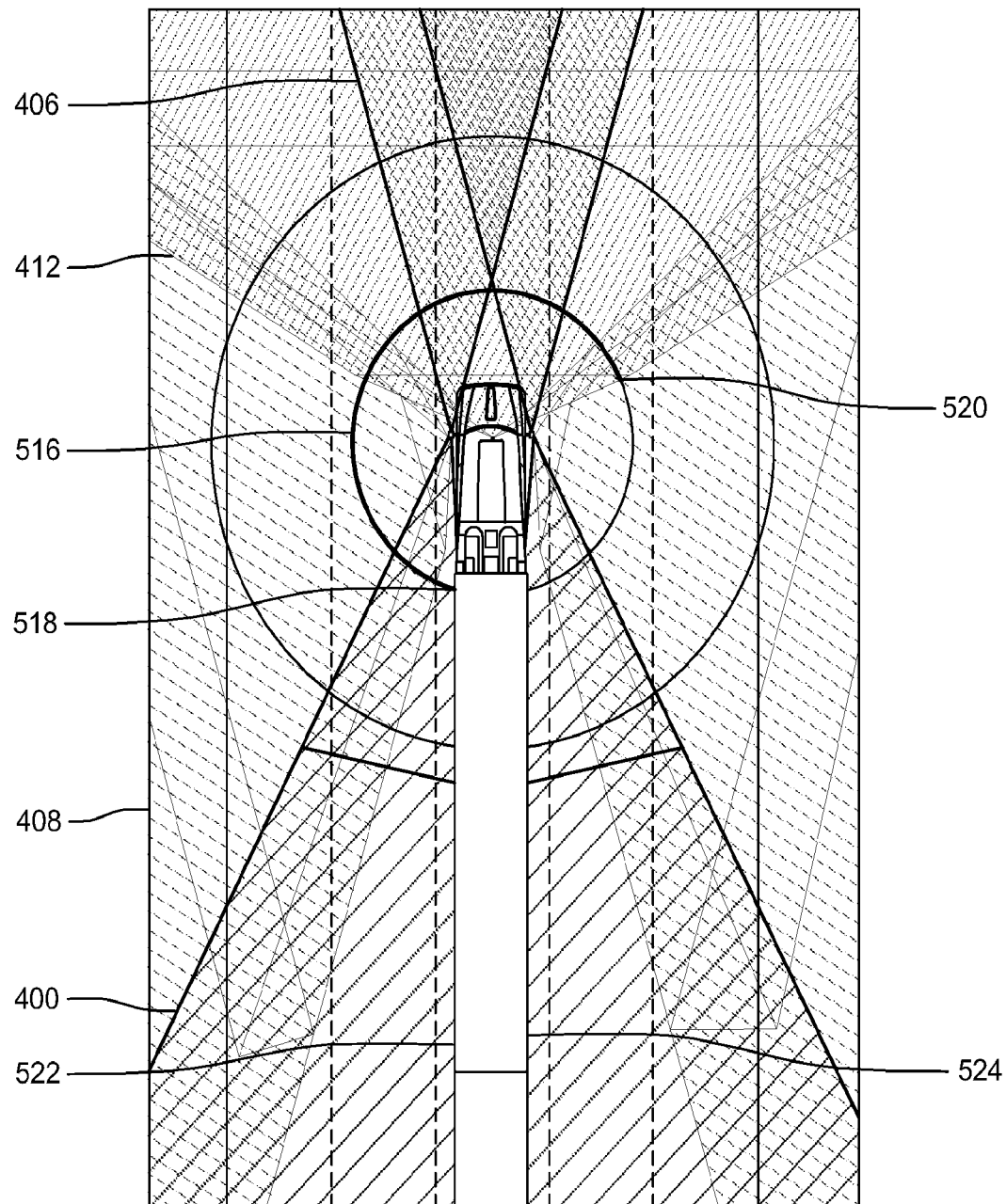
Figures 2, 5:
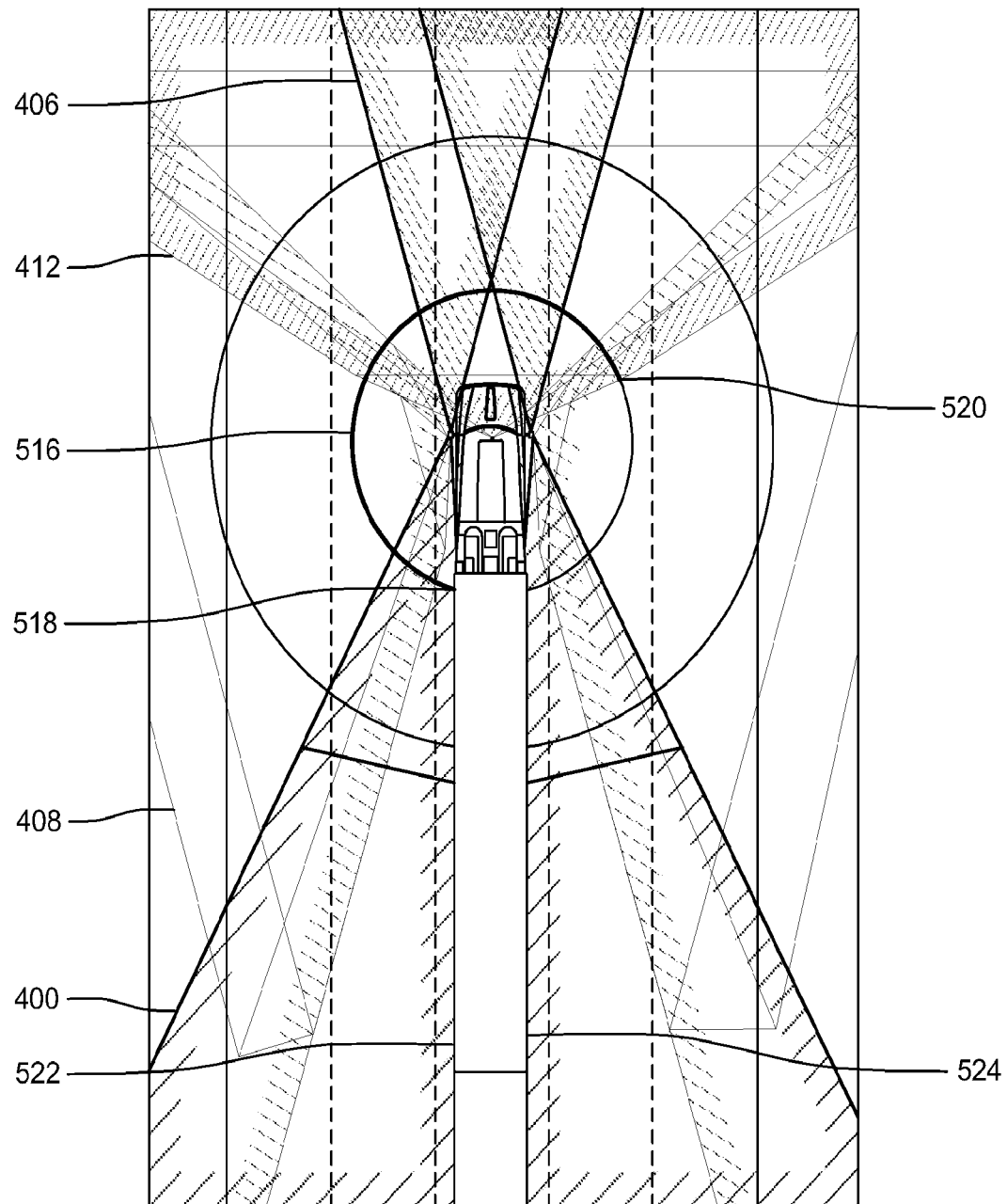

FIGS. 5-1 and 5-2 are schematic illustrations of a top-down view of the combination of the field of view 400 of the first camera 104, the field of view 406 of the second camera 106, the field of view 408 of the third camera 108, and the field of view 412 of the fourth camera 410 according to one aspect of the disclosure. The combined fields form an uninterrupted camera field of view that span more than 180°. For example, the arc 516 spans more than 180°, beginning at a first point 518 at the side of the autonomous vehicle and extending to a second point 520 at the outer edge of the field of view 412 of the fourth camera 410. The arc 516 is completely covered by the camera field of view, without interruption. As illustrated in FIGS. 5-1 and 5-2, with the addition of three cameras on the right side of the autonomous vehicle mirroring the three cameras 104, 106, 108 on the left side of the autonomous vehicle, the camera field of view extends uninterrupted from the left side of the vehicle, to the front of the vehicle, to the right side of the vehicle. In the case of a tractor trailer, the edges of the camera field of view are co-terminus with the sides 522, 524 of the trailer, as shown in FIGS. 5-1 and 5-2.

In one aspect, the fourth camera 410 and the second camera 106 are oriented such that the field of view 412 of the fourth camera 410 overlaps the field of view 406 of the second camera 106. As shown in FIGS. 5-1 and 5-2, the field of view 412 of the fourth camera 410 may completely overlap the field of view 406 of the second camera 106 in a horizontal plane. However, the fourth camera 410 may be oriented at different pitches, and may be configured to capture images of objects at different distances.

Figures 1, 6:
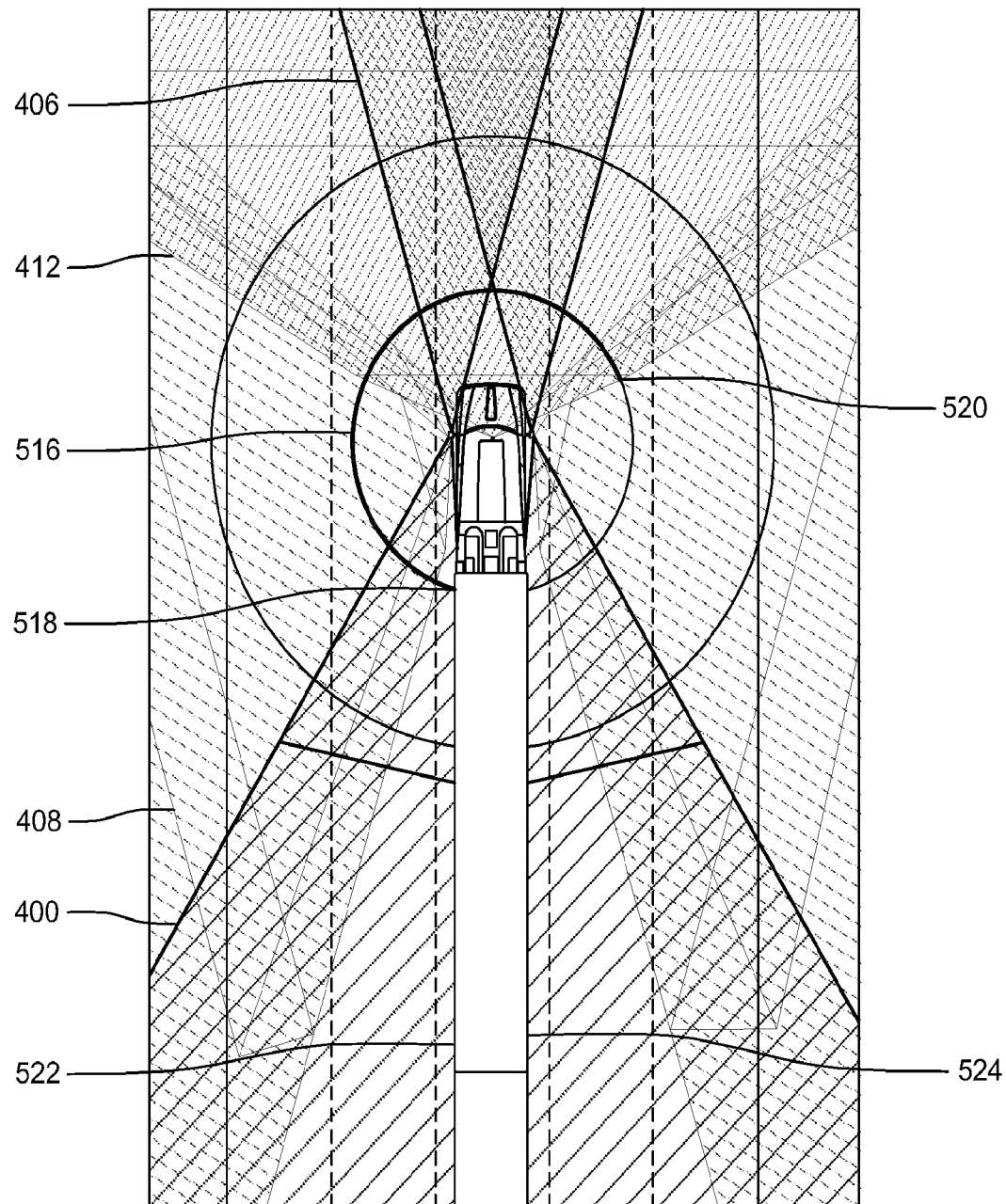
Figures 2, 6:
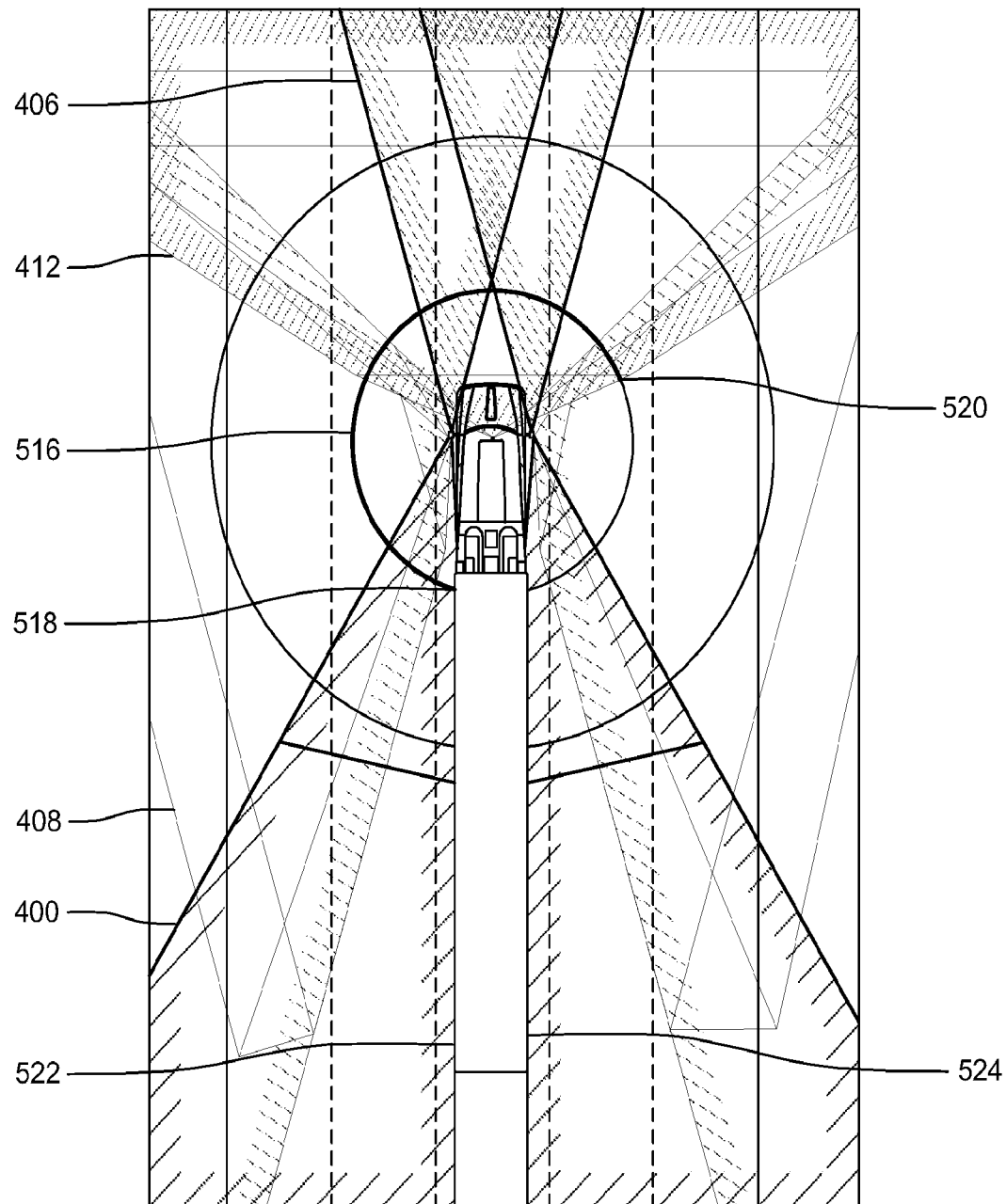

In one aspect, the sensor assembly 100 provides sufficient fault tolerance such that the edges of the camera field of view remain co-terminus with the sides 522, 524 of the trailer when the first camera 104 is maximally offset to tolerance limits. FIGS. 6-1 and 6-2 are schematic illustrations of the camera field of view when the first camera has been rotated away from the autonomous vehicle. As shown in FIGS. 6-1 and 6-2, the overlap between the field of view 400 of the first camera 104 and the field of view 408 of the third camera 108 has increased, but the camera field of view is still co-terminus with the sides 522, 524 of the trailer. This ensures that objects adjacent to the trailer are visible at all times.

Figure 7:
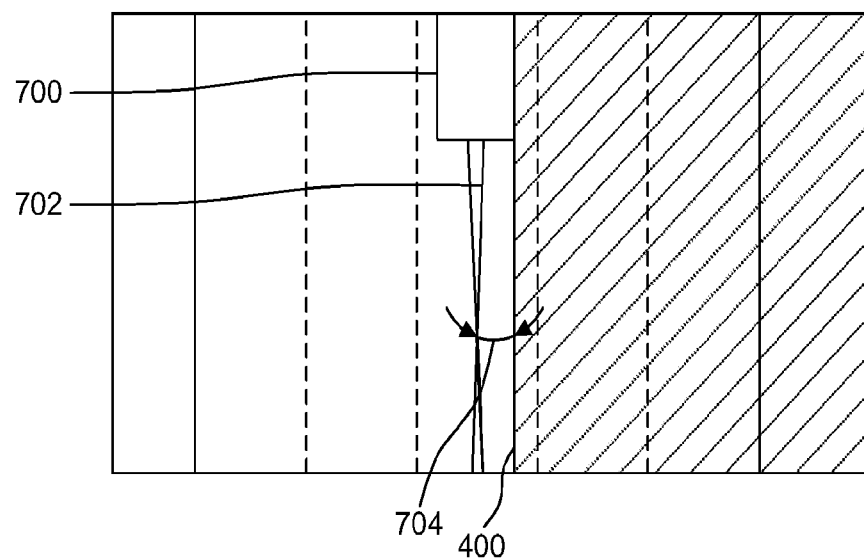
FIG. 7 is a schematic illustration of a distal end of a trailer according to one aspect of the disclosure.

In one aspect, the first camera 104 is oriented such that the side of the trailer is included in the field of view. FIG. 7 shows a distal end of a trailer 700. The field of view 400 of the right-side first camera 104 would extend to the line 702 if the side of the trailer 700 did not obstruct the field of view 400.

Figure 8:
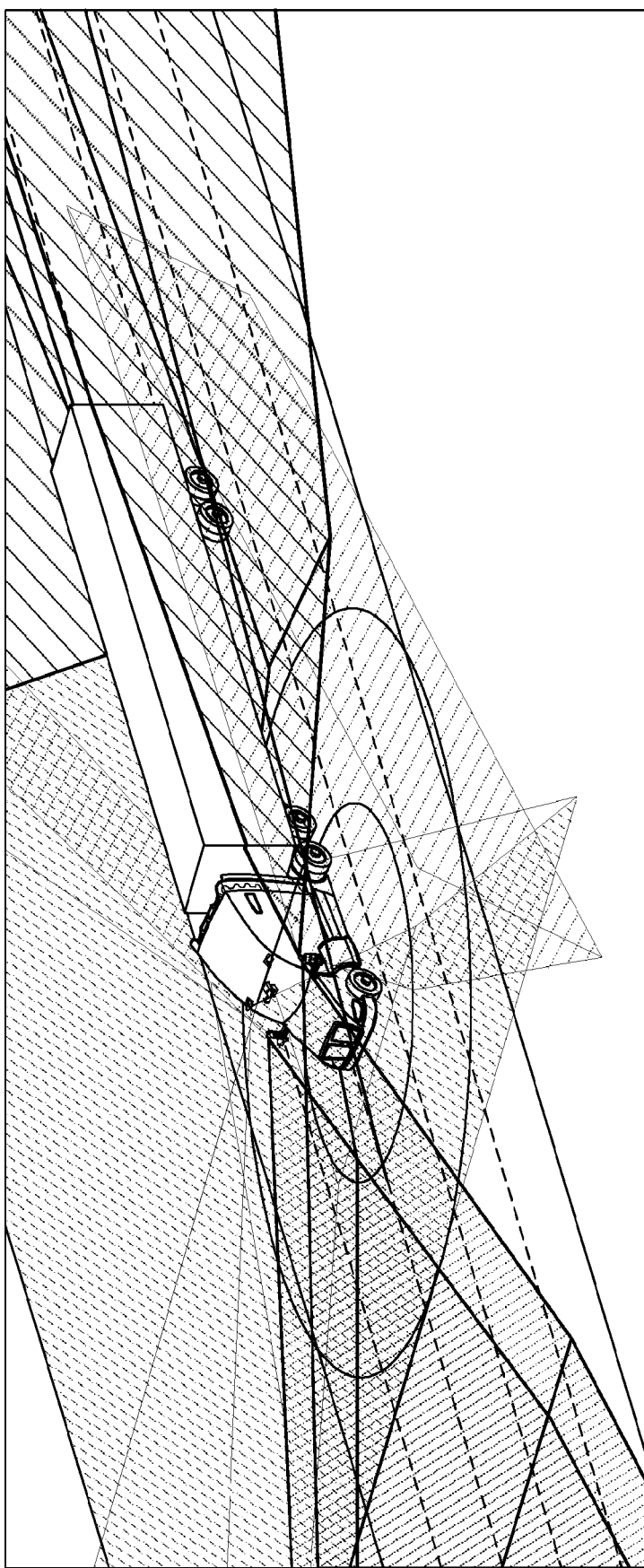
FIGS. 8 and 9 are schematic illustrations of an example camera field of view according to one aspect of the disclosure.
Figure 9:
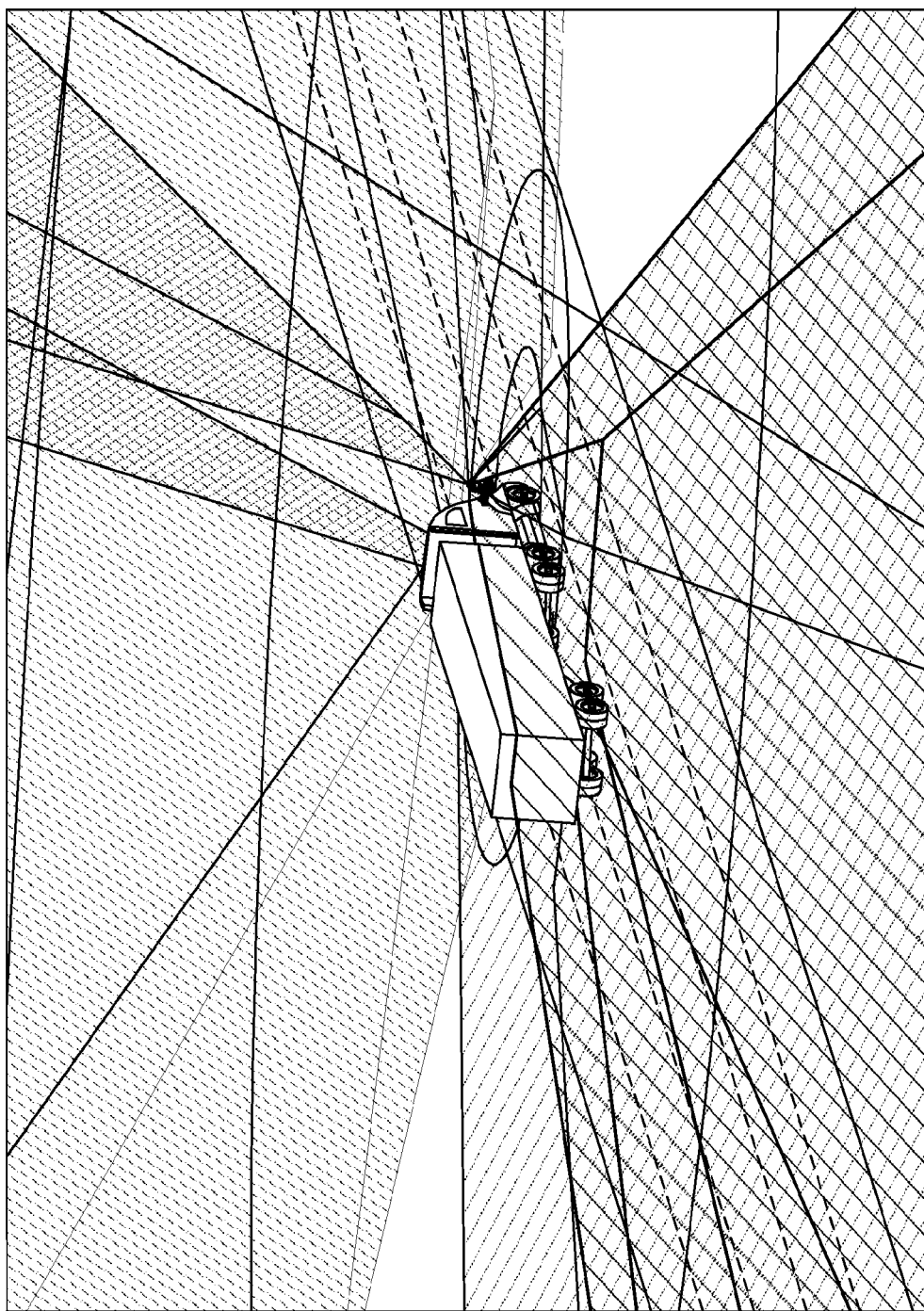

FIGS. 8 and 9 are schematic illustrations of an example camera field of view according to an aspect of the present invention.

Figure 10:
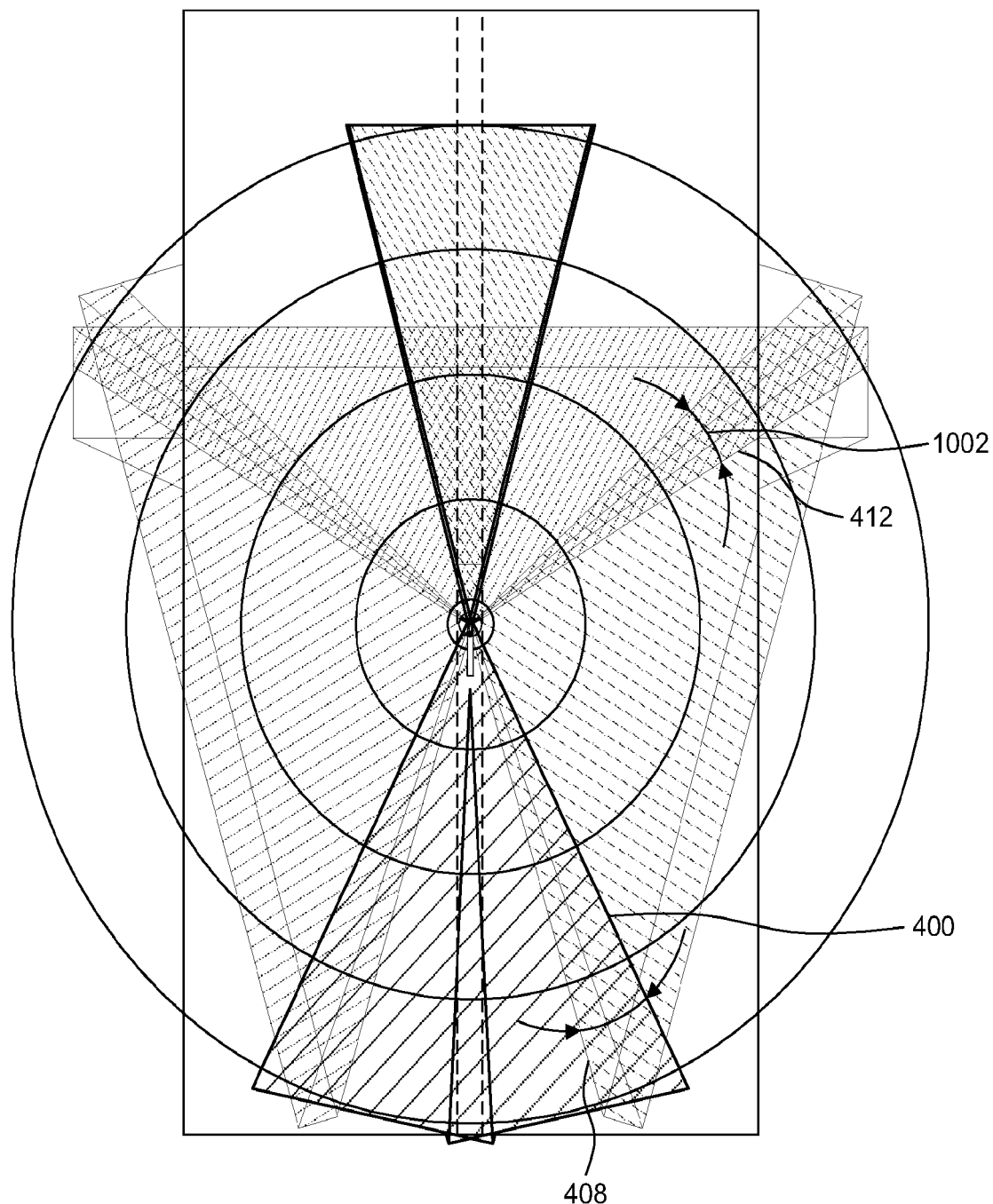
FIG. 10 is a schematic illustration of an example camera field of view of the sensor assembly at 50 m, 100 m, 150 m, and 200 m according to one aspect of the disclosure.

FIG. 10 is a schematic illustration of an example camera field of view of the sensor assembly 100 at 50 m, 100 m, 150 m, and 200 m. In one aspect, the first camera 104 and the third camera 108 are oriented such that the field of view 400 of the first camera 104 overlaps the field of view 408 of the third camera 108. The overlap 1000 is indicated in FIG. 10. In one aspect, the overlap 1000 spans an angle of at least 5°. In one aspect, the overlap 1000 spans an angle of at least 10°. The overlap 1000 increases the fault tolerance of the sensor assembly 100, ensuring that objects approaching from behind the vehicle, for example, can be detected and tracked.

In one aspect, the fourth camera 410 and the third camera 108 are oriented such that the field of view 412 of the fourth camera 410 overlaps the field of view 408 of the third camera 108. The overlap 1002 is indicated in FIG. 10. In one aspect, the overlap 1002 spans an angle of at least 5°. In one aspect, the overlap 1002 spans an angle of at least 10°. The overlap 1000 increases the fault tolerance of the sensor assembly 100, ensuring that objects approaching the vehicle from the front and side, for example, can be detected and tracked.

Figures 1, 11:
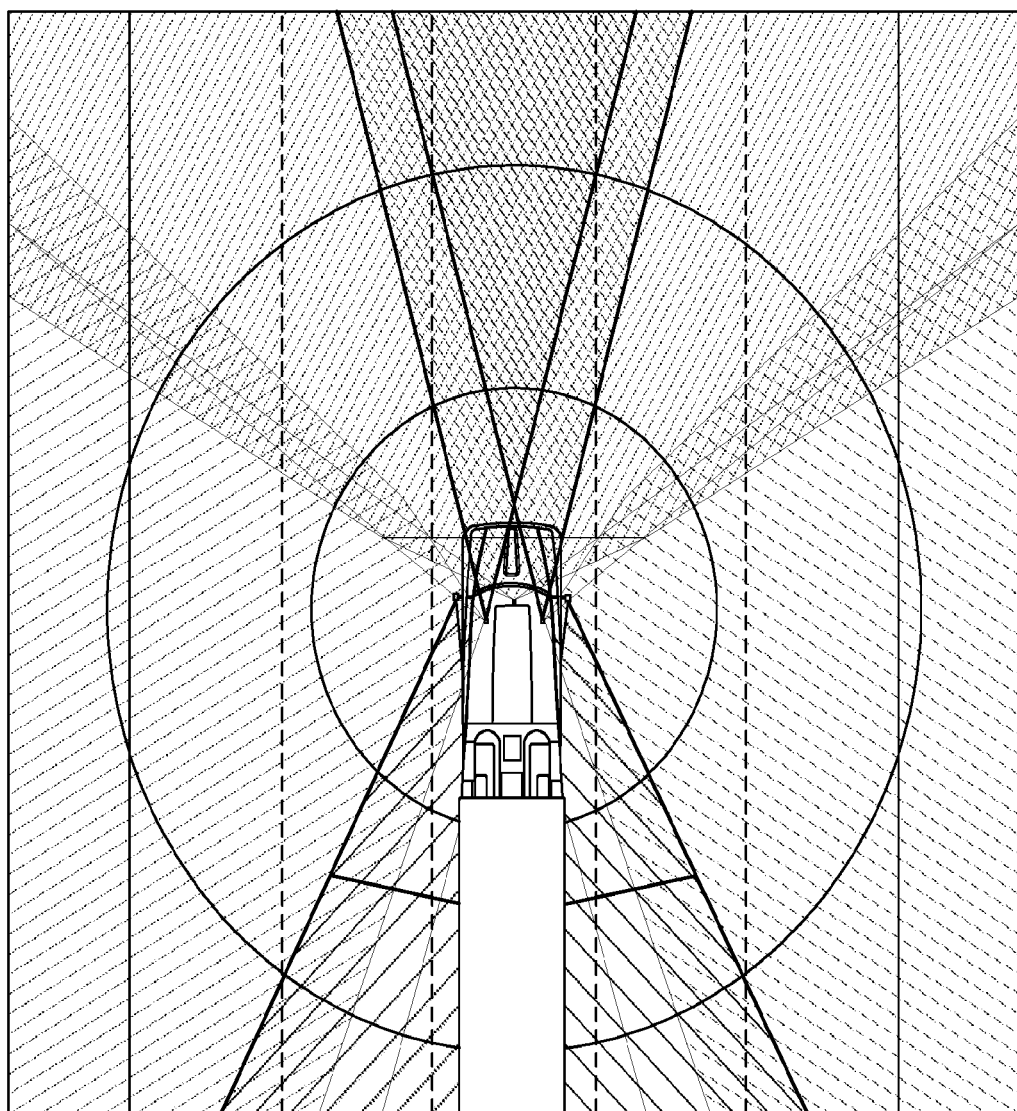
Figures 2, 11:
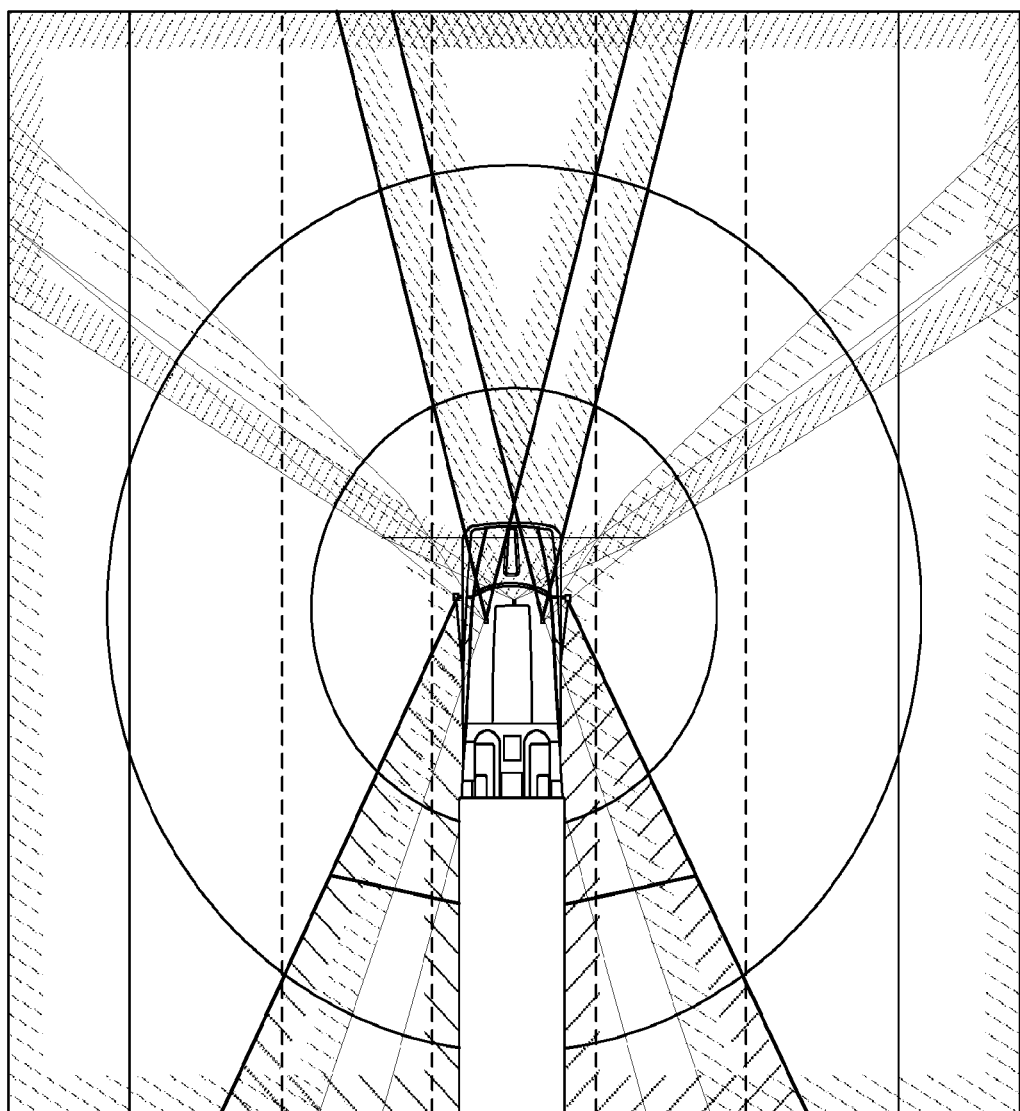
Figure 12:
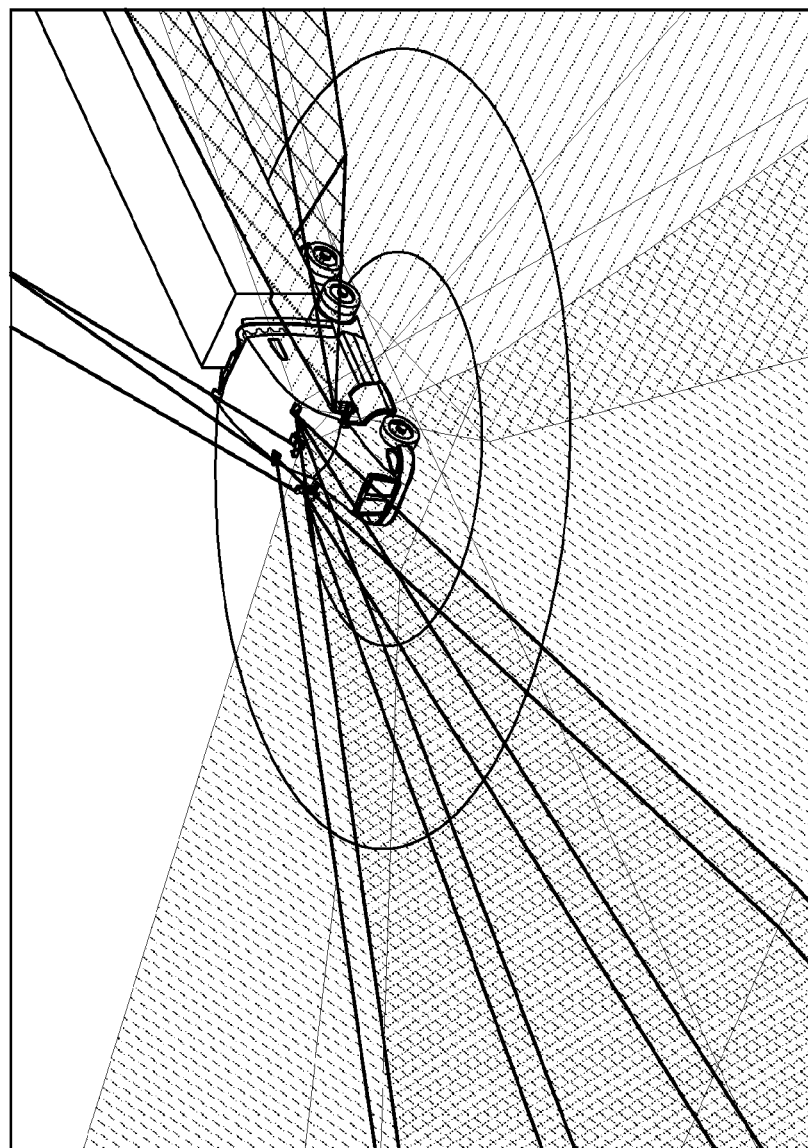
FIG. 12 is a schematic illustration of a perspective view of an example camera field of view of the sensor assembly according to one aspect of the disclosure.

FIGS. 11-1 and 11-2 are more zoomed-in views of the schematic illustration of FIG. 10. In FIG. 11-1, each of the fields of view is filled with a representative pattern, whereas in FIG. 11-2, the representative patterns are only included along the inner edges of the fields of view. FIG. 12 is a schematic illustration of a perspective view of an example camera field of view of the sensor assembly 100.

Figure 13:
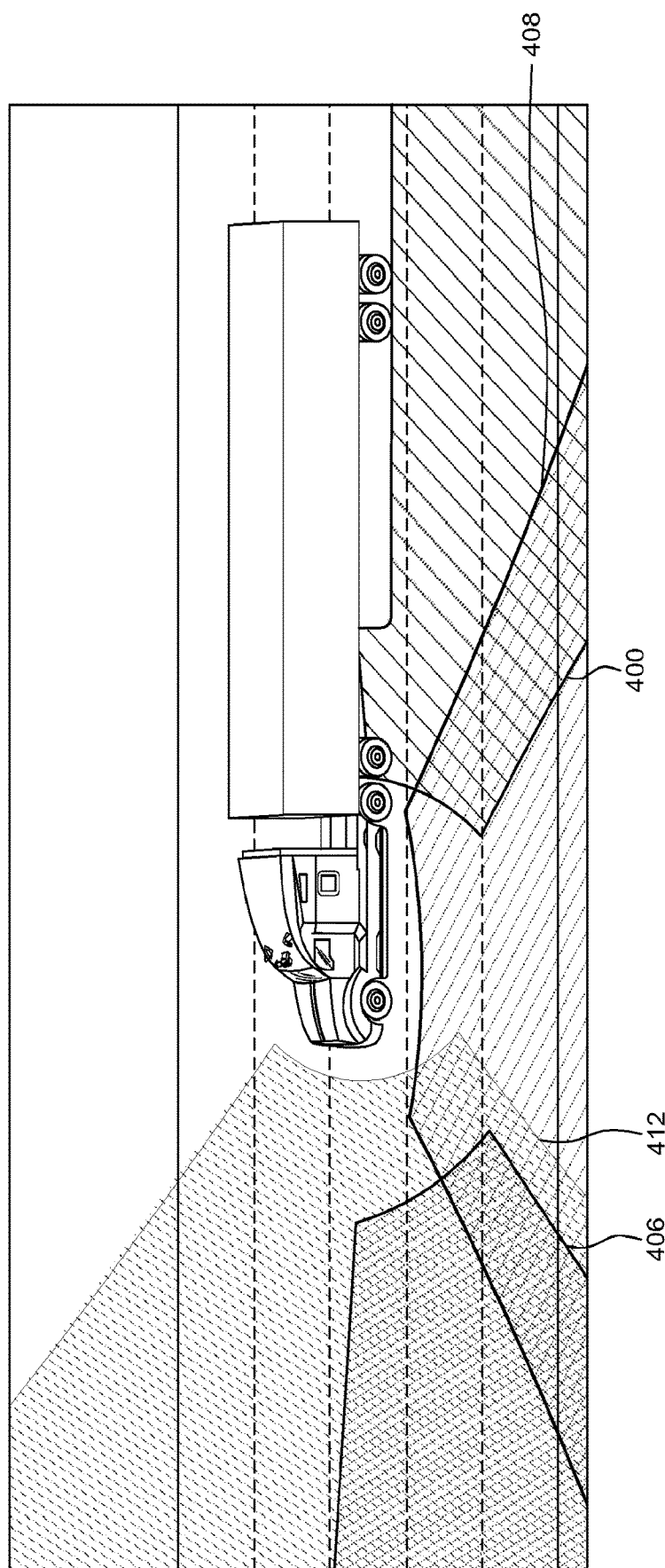
FIG. 13 is a schematic illustration of an example camera field of view according to one aspect of the disclosure.

FIG. 13 is a schematic illustration of an example camera field of view according to an aspect of the disclosure. FIG. 13 shows the field of view 400 corresponding to the first camera 104, the field of view 406 corresponding to the second camera 106, and the field of view 408 corresponding to the third camera 108. The three fields of view 400, 406, 408 provide an uninterrupted camera field of view from the direction of forward travel of the vehicle to a direction opposite the direction of forward travel of the vehicle. The field of view 4U of the fourth camera 410 overlaps the fields of view 406, 408 of the second camera 106 and the third camera 108. The sensor assembly 100 may include three right-side cameras mirroring the three left-side cameras whose fields of view 400, 406, 408 are illustrated in FIG. 13.

Figure 14A:
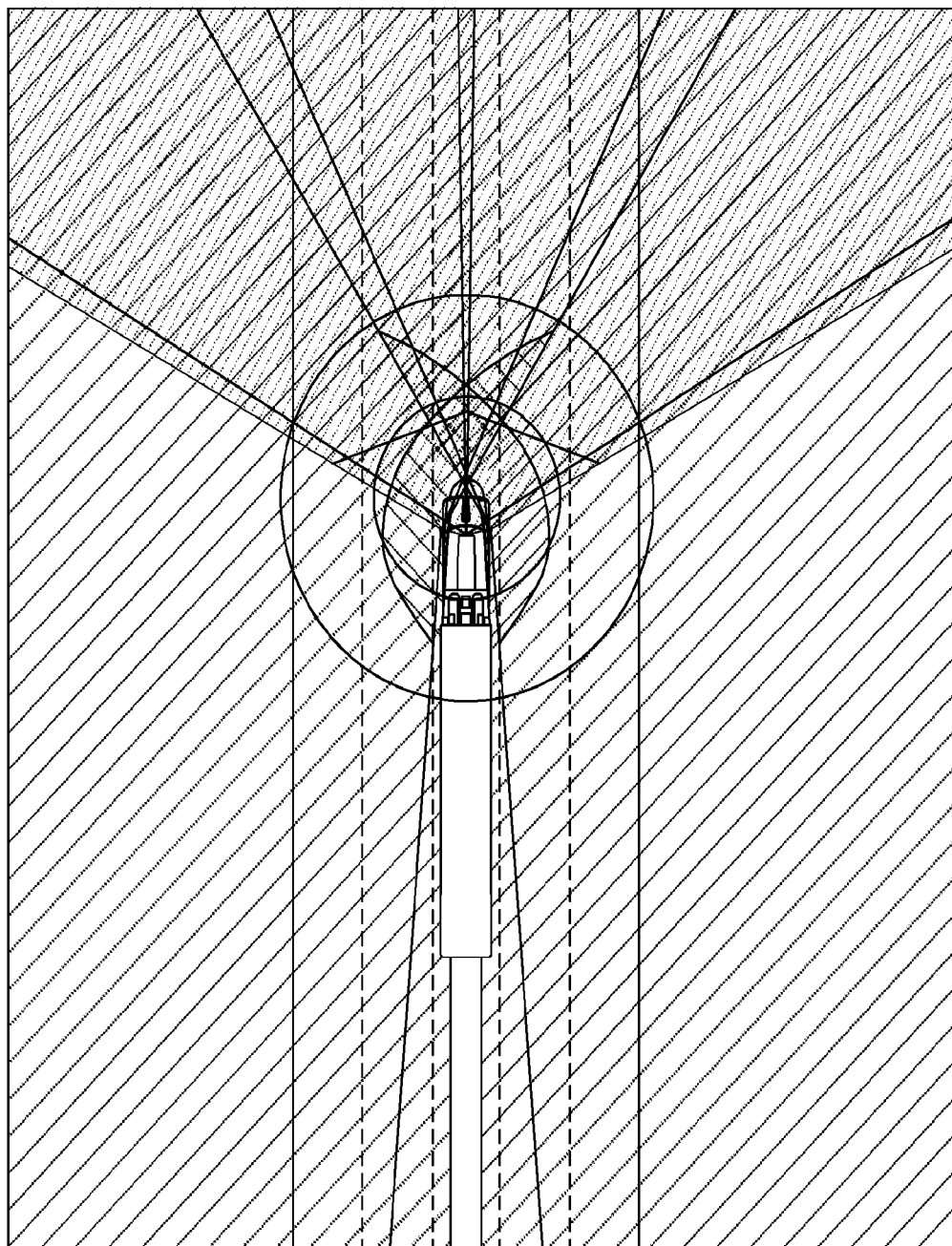
FIG. 14A is a schematic illustration of a total field of view of a front lidar and two side lidars according to one aspect of the disclosure.
Figure 14B:
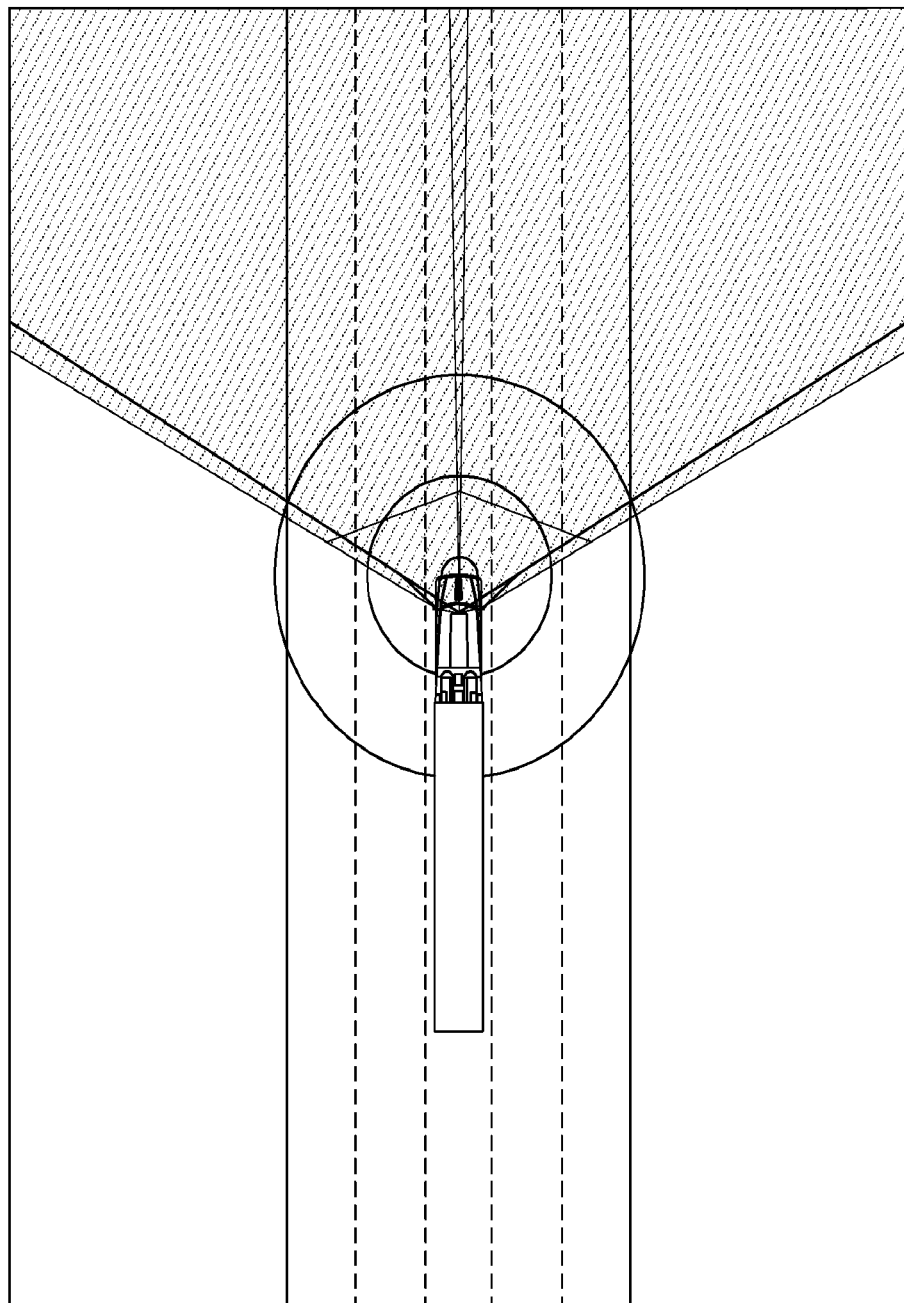
FIG. 14B is a schematic illustration of a field of view of a front lidar according to one aspect of the disclosure.
Figure 14C:
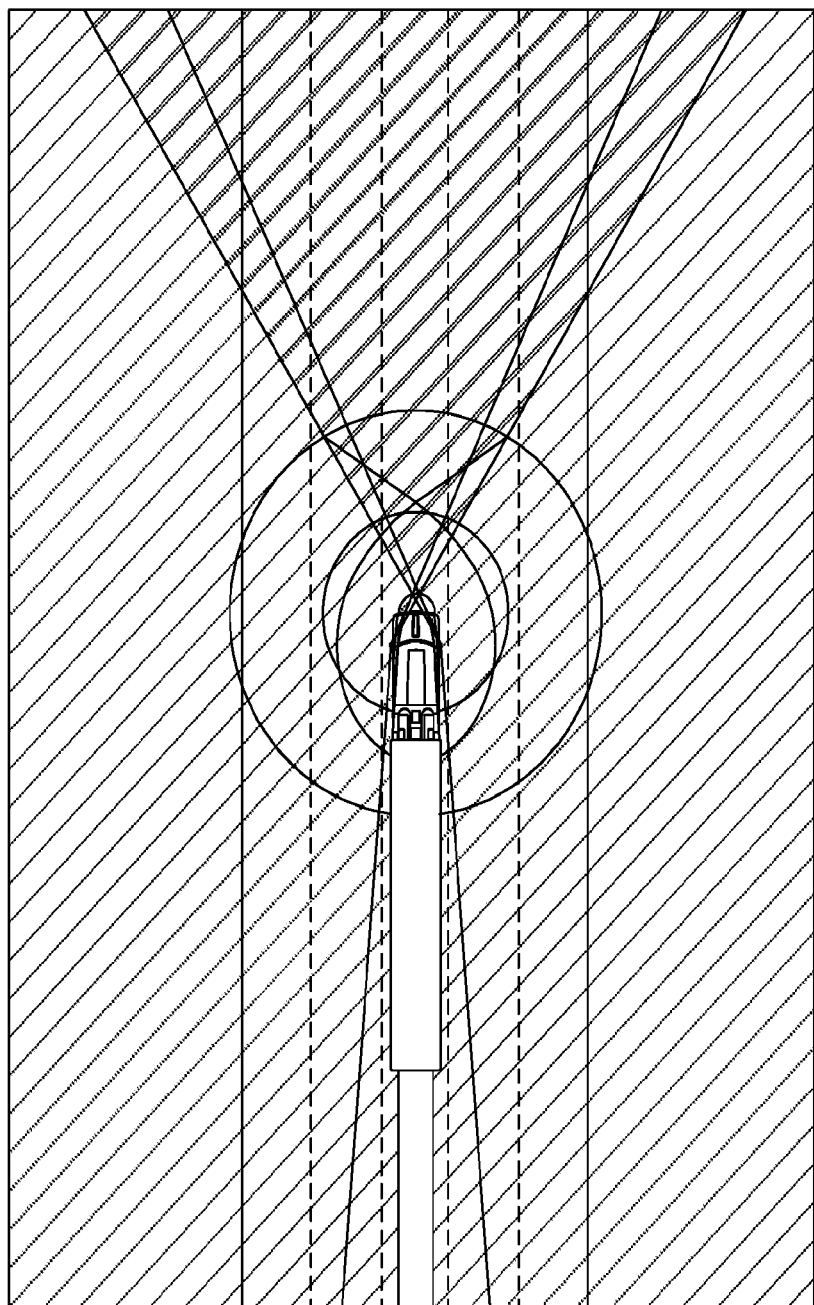
FIG. 14C is a schematic illustration of a total field of view of two side lidars according to one aspect of the disclosure.

According to some embodiments of the invention, the sensor assembly for autonomous vehicles includes a plurality of lidars. FIGS. 14A-14C are schematic illustrations of lidar fields of view according to one aspect. FIG. 14A shows a total field of view of a front lidar (or multiple lidars) and two side lidars. FIG. 14B shows a field of view of a front lidar (or multiple lidars). FIG. 14C shows a total field of view of two side lidars. The two side lidars provide a 360 degree field of view. The field of view can be trimmed, for example, to 210 degrees, using software.

In one aspect, disclosed herein is side view apparatus for an autonomous vehicle comprising: a support frame having a proximal end, a distal end, and a vertical medial plane defined as intersecting and parallel to the vector created by the proximal end and the distal end, wherein the proximal end comprises a coupling for attachment to the autonomous vehicle, and wherein the distal end comprises a rear-facing portion, an upper portion and a lower portion; a camera attached to the distal end of the support frame; and one, two, or more of a lidar, a radar, and an inertial measurement unit (IMU) attached to the distal end of the support frame.

In some embodiments, the side view apparatus comprises a radar. In some embodiments, the radar is directed towards the rear-facing portion of the support frame. In some embodiments, the radar is directed within about 0 degrees to about 180 degrees of the vertical medial plane. In some embodiments, the radar is positioned at the lower portion of the distal end of the support frame. In some embodiments, the radar is positioned at the upper portion of the distal end of the support frame. In some embodiments, the side view apparatus comprises a lidar. In some embodiments, the lidar comprises a Frequency Modulated Continuous Wave (FMCW) laser. In some embodiments, the lidar is positioned at the lower portion of the distal end of the support frame. In some embodiments, the lidar is positioned at the upper portion of the distal end of the support frame. In some embodiments, the camera is positioned at the upper portion of the distal end of the support frame. In some embodiments, the camera is directed towards the rear-facing portion of the support frame. In some embodiments, the side view apparatus comprises an inertial measurement unit (IMU) attached to the distal end of the support frame. In some embodiments, the side view apparatus further comprises a mirror attachment on the rear-facing portion of the support frame, wherein the mirror attachment is configured to receive a mirror assembly. In some embodiments, the side view apparatus further comprises a mirror assembly on the rear-facing portion of the support frame. In some embodiments, the autonomous vehicle comprises a car, a truck, a semi-trailer truck, a trailer, a cart, a snowmobile, a tank, a bulldozer, a tractor, a van, a bus, a motorcycle, a scooter, or a steamroller.

In some embodiments, the camera is directed within about 0 degrees of the vertical medial plane to about 180 degrees of the vertical medial plane. In some embodiments, a distance from the proximal end to the distal end of the support frame is about 50 mm to about 650 mm. In some embodiments, the side view apparatus has a natural frequency of about 20 Hz to about 200 Hz.

Another aspect provided herein is a sensor system for an autonomous vehicle comprising a left side view apparatus, a right side view apparatus, or a left side view apparatus and a right side view apparatus, wherein the left side view apparatus and the right side view apparatus comprise: a support frame having a proximal end, a distal end, and defining a vertical medial plane intersecting and parallel to the vector created by the proximal end and the distal end, wherein the proximal end comprises a coupling for attachment to the autonomous vehicle, and wherein the distal end comprises a rear-facing portion, an upper portion and a lower portion; a camera attached to the distal end of the support frame; and one, two, or more of a lidar, a radar, and an inertial measurement unit (IMU) attached to the distal end of the support frame; and one or more of: a left side sensor assembly configured to mount to left side of the autonomous vehicle; a right side sensor assembly configured to mount to right side of the autonomous vehicle; and a top side sensor assembly configured to mount to a roof of the autonomous vehicle; wherein the left side sensor assembly, the right side sensor assembly, and the top side sensor assembly comprise one or more of: a vehicle camera; a vehicle lidar; and a vehicle radar.

In some embodiments, the left side view apparatus and the right side view apparatus comprise a radar. In some embodiments, the radar is directed towards the rear-facing portion of the support frame. In some embodiments, the radar is directed within about 0 degrees to about 180 degrees of the vertical medial plane. In some embodiments, the radar is positioned at the lower portion of the distal end of the support frame. In some embodiments, the radar is positioned at the upper portion of the distal end of the support frame.

In some embodiments, the sensor system comprises a lidar. In some embodiments, the lidar comprises a Frequency Modulated Continuous Wave (FMCW) laser. In some embodiments, the lidar is positioned at the lower portion of the distal end of the support frame. In some embodiments, the lidar is positioned at the upper portion of the distal end of the support frame.

In some embodiments, at the camera is positioned at the upper portion of the distal end of the support frame. In some embodiments, the sensor system comprises an inertial measurement unit (IMU) attached to the distal end of the support frame. In some embodiments, the sensor system further comprises a mirror attachment on the rear-facing portion of the support frame, wherein the mirror attachment is configured to receive a mirror assembly. In some embodiments, the sensor system further comprises a mirror assembly on the rear-facing portion of the support frame. In some embodiments, the autonomous vehicle comprises a car, a truck, a semi-trailer truck, a trailer, a cart, a snowmobile, a tank, a bulldozer, a tractor, a van, a bus, a motorcycle, a scooter, or a steamroller. In some embodiments, the vehicle camera comprises an infrared camera. In some embodiments, the vehicle lidar comprises a front view lidar, a side view lidar, and/or a rear view lidar. In some embodiments, the vehicle radar comprises a front view radar, a side view radar, and/or a rear view radar.

In some embodiments, the camera is directed towards the rear-facing portion of the support frame. In some embodiments, a distance from the proximal end to the distal end of the support frame is about 50 mm to about 650 mm. In some embodiments, the side view apparatus has a natural frequency of about 20 Hz to about 200 Hz.

Another aspect provided herein is a retrofit sensor kit for an autonomous vehicle comprising a left side view apparatus, a right side view apparatus, or a left side view apparatus and a right side view apparatus, wherein the left side view apparatus and the right side view apparatus comprise: a support frame having a proximal end, a distal end, and defining a vertical medial plane intersecting and parallel to the vector created by the proximal end and the distal end, wherein the proximal end comprises a coupling for attachment to the autonomous vehicle, and wherein the distal end comprises a rear-facing portion, an upper portion and a lower portion; a camera attached to the distal end of the support frame; and one, two, or more of a lidar, a radar, and an inertial measurement unit (IMU) attached to the distal end of the support frame; and a fastener configured to attach at least one of the left side view apparatus, the right side view apparatus to the autonomous.

In some embodiments, the left side view apparatus and the right side view apparatus comprise a radar. In some embodiments, the radar is directed towards the rear-facing portion of the support frame. In some embodiments, the radar is directed within about 0 degrees to about 180 degrees of the vertical medial plane. In some embodiments, the radar is positioned at the lower portion of the distal end of the support frame. In some embodiments, the radar is positioned at the upper portion of the distal end of the support frame.

In some embodiments, the retrofit sensor kit comprises lidar. In some embodiments, the lidar comprises a Frequency Modulated Continuous Wave (FMCW) laser. In some embodiments, the lidar is positioned at the lower portion of the distal end of the support frame. In some embodiments, the lidar is positioned at the upper portion of the distal end of the support frame.

In some embodiments, at the camera is positioned at the upper portion of the distal end of the support frame. In some embodiments, the camera is directed towards the rear-facing portion of the support frame. In some embodiments, the camera is directed within about 0 degrees to about 180 degrees of the vertical medial plane.

In some embodiments, a distance from the proximal end to the distal end of the support frame is at least about 50 mm. In some embodiments, a distance from the proximal end to the distal end of the support frame is about 300 mm to about 650 mm. In some embodiments, the retrofit sensor kit has a natural frequency of about 20 Hz to about 200 Hz. In some embodiments, the retrofit sensor kit further comprises an inertial measurement unit (IMU) attached to the distal end of the support frame.

In some embodiments, the retrofit sensor kit further comprises a mirror attachment on the rear-facing portion of the support frame, wherein the mirror attachment is configured to receive a mirror assembly. In some embodiments, the retrofit sensor kit further comprises a mirror assembly on the rear-facing portion of the support frame. In some embodiments, the autonomous vehicle comprises a car, a truck, a semi-trailer truck, a trailer, a cart, a snowmobile, a tank, a bulldozer, a tractor, a van, a bus, a motorcycle, a scooter, or a steamroller. In some embodiments, the fastener comprises a screw, a bolt, a nut, an adhesive, a tape, a tie, a rope, a clamp, or any combination thereof.

Provided herein are apparatus, systems, and kits comprising support structures and sensors configured to provide greater fields of view and high quality data for autonomous driving. The specific sensor placement and the rigidity of the support structures herein enable a sufficient field of view while reducing vibrational disturbances to provide greater object detection rate and higher quality positional data.

Side View Apparatus for an Autonomous Vehicle

One aspect disclosed herein is per FIGS. 15-18 and 22-28 is a side view apparatus 1500 for an autonomous vehicle comprising a support frame 1501, a camera 1502 attached to the support frame 1501, and one, two, or more of a lidar 1503, a radar 1504, and an inertial measurement unit (IMU) 1506 attached to the distal end of the support frame 1501. The side view apparatus 1500 may be configured for a specific type of autonomous vehicle. The side view apparatus 1500 may be a left side view apparatus 1500 or a right side view apparatus 1500.

The support frame 1501 may have a proximal end 1501B, a distal end 1501A, and a vertical medial plane 1510 defined as intersecting and parallel to the vector created by the proximal end 1501B and the distal end 1501A. The proximal end 1501B may be defined as an end of the support frame 1501 or an end of the side view apparatus that is closest to the autonomous vehicle. The distal end 1501A may be defined as an end of the support frame 1501 or an end of the side view apparatus that is farthest from the autonomous vehicle. The distal end 1501A of the support frame 1501 may comprise a rear facing portion 1520, an upper portion 1501C, and a lower portion 1501D. The rear facing portion 1520 may be defined as a portion of the support frame 1501 closest to the rear of the autonomous vehicle. The rear facing portion 1520 may be defined as a portion of the support frame 1501 furthest from the front of the autonomous vehicle. The upper portion 1501C of the support frame 1501 may be defined as an upper most portion of the support frame 1501. The upper portion 1501C of the support frame 1501 may be defined as a portion of the support frame 1501 that is furthest from the ground when the side view apparatus is installed on the autonomous vehicle. The lower portion 1501D of the support frame 1501 may be defined as a bottommost portion of the support frame 1501. The lower portion 1501D of the support frame 1501 may be defined as a portion of the support frame 1501 that is closest from the ground when the side view apparatus is installed on the autonomous vehicle.

The side view apparatus 1500 may be installed on a vehicle without requiring a material modification to the autonomous vehicle. The side view apparatus 1500 may be installed on the autonomous vehicle without preventing access to the vehicle by a human driver. The side view apparatus 1500 may be installed on the autonomous vehicle without preventing a human driver from operating the autonomous vehicle. The side view apparatus 1500 may be installed on the autonomous vehicle without significantly precluding the field of vision of a human driver. Such access to a human driver allows more complex loading and unloading maneuvers, precise operation in dangerous or restricted areas, and enables a safety and/or security member to remain within the vehicle, with or without operating the vehicle.

The data collected by the camera 1502, the radar 1504, the lidar 1503, the inertial measurement unit (IMU) 1506, or any combination thereof, may be transmitted to the autonomous vehicle, whereby autonomous vehicle employs such data towards navigation and driving.

The side view apparatus 1500 may further comprise an antenna, an antenna mount, a data port, a satellite receiver, or any combination thereof Support Frame The support frame 1501 serves as a stable platform for data capture by a camera 1502, and one or more of a radar 1504, a lidar 1503, and an inertial measurement unit (IMU) 1506. The configurations of the support frame 1501 disclosed herein enable object detection at greater fields of view while preventing vibrations and external forces from degrading the quality of such data. As cameras 1502, radars 1504, and lidars 1503 capture data radially, minute disturbances or fluctuations of the origin of collection propagate linearly as a function of the distance of the detected object. The degradation of such data, especially in the described field of autonomous vehicles, is hazardous to both the vehicle itself as well as its surroundings.

The support frame 1501 may have a proximal end 1501B, a distal end 1501A, and a vertical medial plane 1510 defined as intersecting and parallel to the vector created by the proximal end 1501B and the distal end 1501A. The distal end 1501A of the support frame 1501 may comprise a rear-facing portion, an upper portion 1501C, and a lower portion 1501D. The proximal end 1501B of the support frame 1501 may comprise a coupling 1505 for attachment to the autonomous vehicle.

Figure 16:
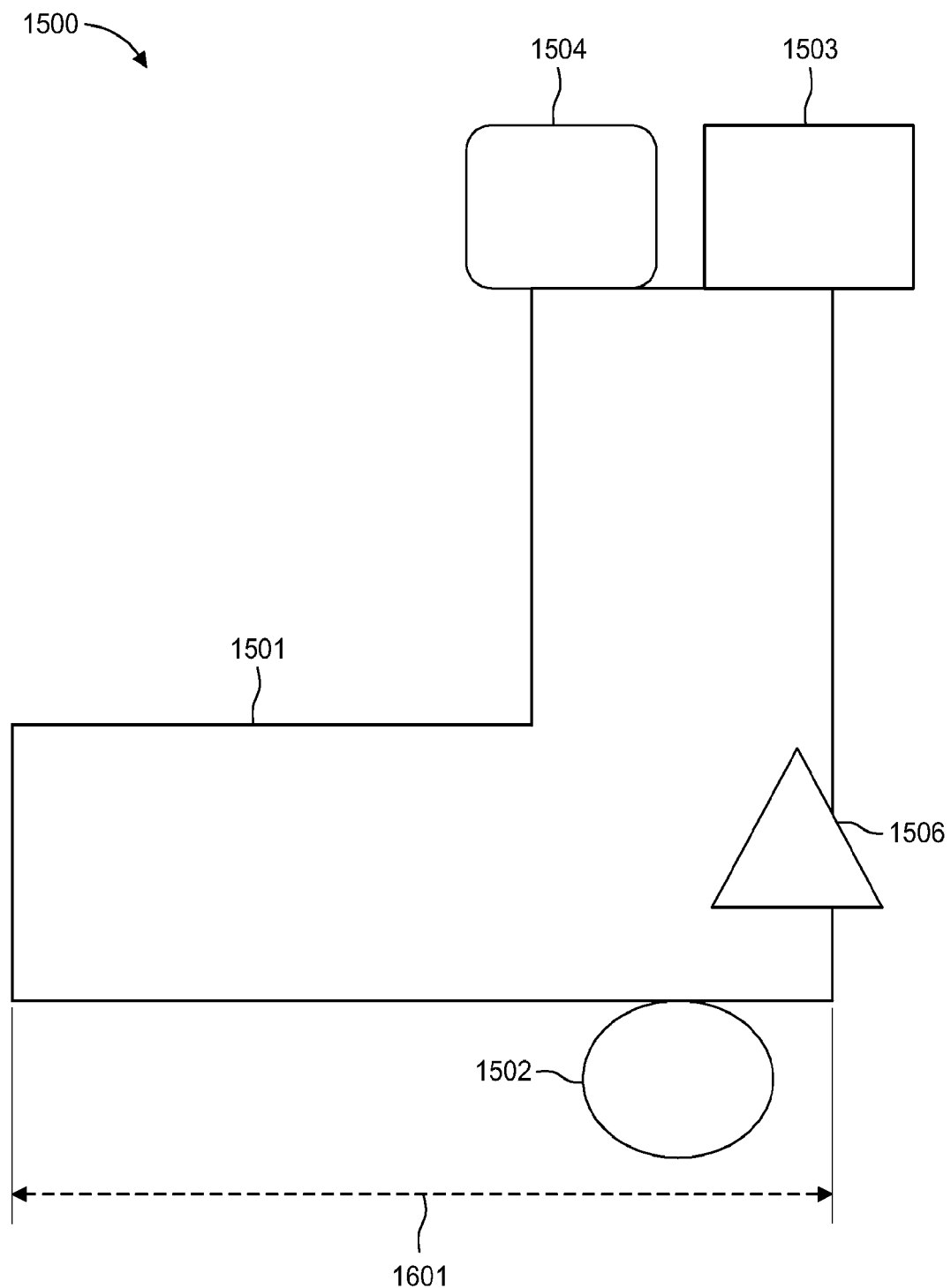
FIG. 16 shows a non-limiting illustration of a side view apparatus for an autonomous vehicle according to one aspect of the disclosure.

In some embodiments, per FIG. 16, a distance 1601 from the proximal end 1501B to the distal end 1501A of the support frame 1501 is about 50 mm to about 650 mm. The distance 1601 from the proximal end 1501B to the distal end 1501A of the support frame 1501 may be measured as a maximum distance, a minimum distance, or an average distance between the proximal end 1501B and the distal end 1501A of the support frame 1501. The distance 1601 from the proximal end 1501B to the distal end 1501A of the support frame 1501 may directly correlate with the field of view of the side view apparatus 1500, whereby a greater distance 1601 allows for a greater field of view as the sensing devices are offset further from the autonomous vehicle.

In some embodiments, the support frame 1501 enables the side view apparatus to have a natural frequency of about 20 Hz to about 200 Hz. The natural frequency is configured to provide the best performance of the system and reduce data distortion. The frame may have a specific mass, center of mass, material properties, and geometry, or any combination thereof to reduce the natural frequency of the support structure and the side view apparatus.

Figure 15:
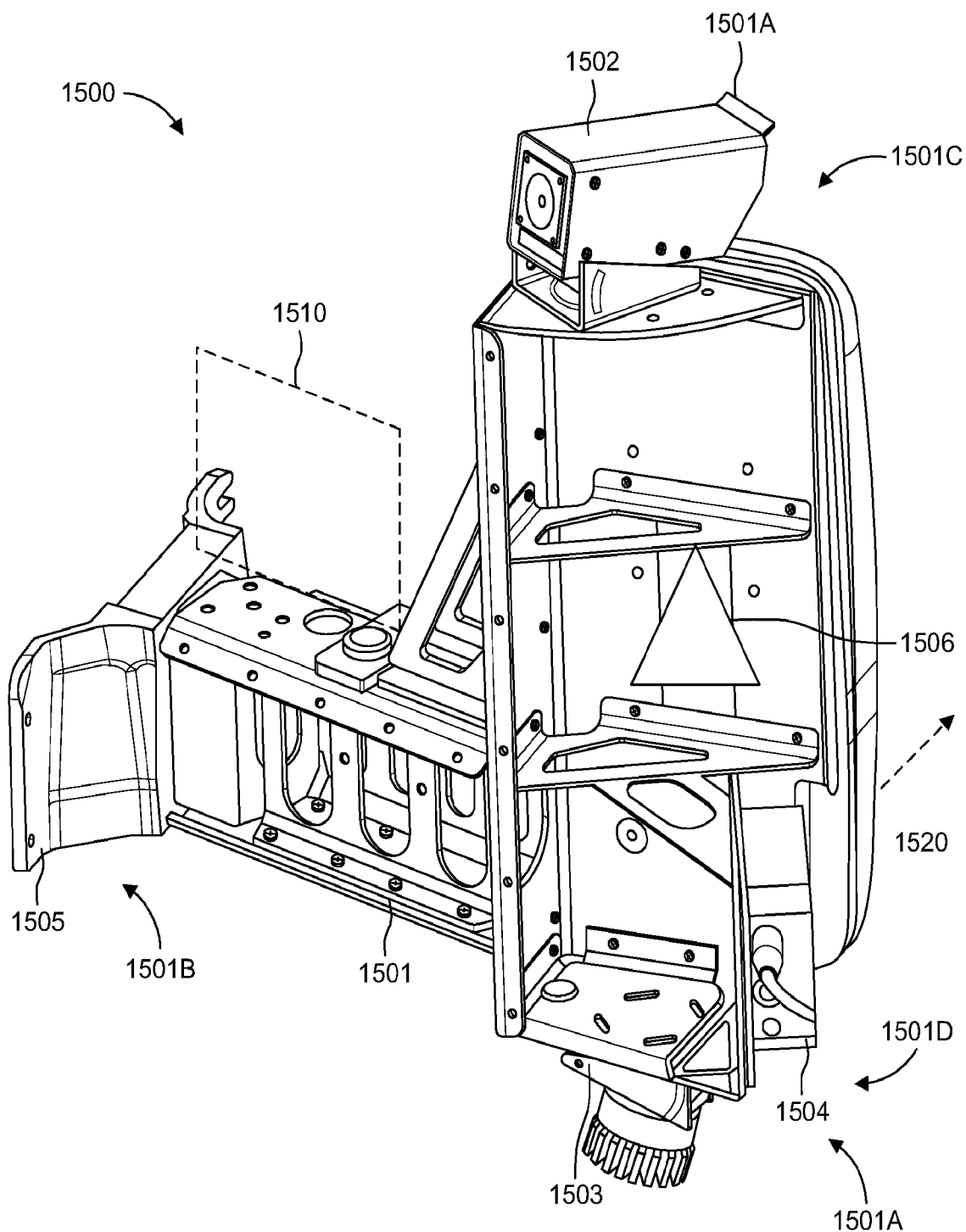
FIG. 15 shows a non-limiting perspective illustration of a side view apparatus for an autonomous vehicle according to one aspect of the disclosure.

As shown in FIG. 15, the support structure may comprise a strut, a bracket, a frame, or any combination thereof for rigidity. The support frame 1501 may further comprise a spring, a dampener, a pulley, a plumb, or any combination thereof. The two or more components of the support structure may be adjoined by any common means including, but not limited to, nuts, bolts, screws, rivets, welds, and adhesives. The support structure may be composed of any rigid material including, but not limited to, steel, stainless steel, aluminum, carbon fiber, fiberglass, plastic, and glass. Per FIG. 18, the support structure may comprise a housing. The housing may be designed to reduce a parasitic drag imparted by the side view apparatus 1500.

Coupling

The coupling 1505 may comprise a shaft, a bearing, a hole, a screw, a bolt, a nut, a hinge, or any combination thereof. The coupling 1505 may comprise a removable coupling 1505. The coupling 1505 may comprise a permanent coupling 1505. The coupling 1505 may comprise a rotating coupling 1505. The coupling 1505 may comprise an existing coupling of the autonomous vehicle. The rotating coupling 1505 may comprise a motor or an engine to rotate the coupling 1505. The rotating coupling 1505 may comprise a lock to set a rotational orientation of the coupling 1505. The rotating coupling 1505 may rotate about a vertical axis. The vertical axis may be coincident with the medial plane 1510. The coupling 1505 should be sturdy and rigid to withstand vibrational forces between the autonomous vehicle and the support frame 1501. The coupling 1505 may or may not require a modification to the autonomous vehicle.

Cameras

The side view apparatus 1500 may comprise one or more cameras 1502. The camera 1502 may be attached to the distal end 1501A of the support frame 1501. As seen in FIG. 15, the camera 1502 may be positioned at the upper portion 1501C of the distal end 1501A of the support frame 1501. The camera 1502 may be positioned above the upper portion 1501C of the support structure. The camera 1502 may be positioned at the lower portion 1501D of the distal end 1501A of the support frame 1501. The camera 1502 may be attached at a fixed position on the support frame 1501. The camera 1502 may comprise a camera 1502 housing. The camera 1502 may comprise a tilt configured to change an orientation of the camera 1502 with respect to the support frame 1501. The camera 1502 may comprise a tilt configured to change an orientation of the camera 1502 about one or more axes, with respect to the support frame 1501. The camera 1502 may be configured to zoom in or out to increase or decrease the image magnification, respectfully. The camera 1502 may comprise a video camera, an infrared camera, a thermal imaging camera, or any combination thereof. The camera 1502 may have a resolution of 1, 2, 3, 4, 5, 6, 7, 8, 9, 10, 12, 14, 16, 18, 20, 30 or more megapixels, including increments therein. The camera may have a focal length of about 4 mm to about 30 mm. The camera 1502 may have a focal length of about or at least about 4, 6, 8, 12, 14, 16, 18, 20, 22, 24, 26, or 28 mm, including increments therein. The camera 1502 may have a field of view of at least about 25, 30, 35, 40, 45, 50, 55, 60, 65, 70, 75, 80, 85, 90, 95, 100, 110, 120, 130, 140, 150, 160, 170, or 180 degrees, including increments therein. The camera 1502 may have a field of view of at most about 25, 30, 35, 40, 45, 50, 55, 60, 65, 70, 75, 80, 85, 90, 95, 100, 110, 120, 130, 140, 150, 160, 170, or 180 degrees, including increments therein. The camera 1502 may have a field of view of about 25, 30, 35, 40, 45, 50, 55, 60, 65, 70, 75, 80, 85, 90, 95, 100, 110, 120, 130, 140, 150, 160, 170, 180 degrees or more, including increments therein.

The camera 1502 may correspond to one or more of the first camera 104, the second camera 106, and the third camera 108 described above. According to one aspect, the camera 1502 corresponds to the first camera 104 described above. The camera 1502 may be directed towards the rear-facing portion of the support frame 1501. As seen in FIG. 15, the camera 1502 may be directed at an angle of about 30 degrees with respect to the medial plane 1510 and about a vertical axis. In some embodiments, the camera 1502 is directed within 90, 80, 70, 60, 50, 40, 30, 20, or 10 degrees of perpendicular to the vertical medial plane 110, including increments therein. In some embodiments, the camera 1502 is directed within 90 degrees of perpendicular to the vertical medial plane 1510 about a vertical axis. The vertical axis may be parallel or coincident with the medial plane 1510. Further, the camera 1502 may be directed at a pitch of within about 45 degrees of a horizontal plane perpendicular to the medial vertical plane. The camera 1502 may be directed at a tilt of within about 45, 40, 35, 30, 25, 20, 15, 10, or 5 degrees of a horizontal plane, including increments therein. The pitch may be a positive upward directed pitch or a negative downward directed pitch. The camera 1502 may be positioned about 50 mm to about 650 mm from the proximal end 1501B of the support structure. The position of the camera 1502 may be defined by a point-to-point distance from the proximal end 1501B of the support structure, a horizontal distance from the proximal end 1501B of the support structure, or a vertical distance from the proximal end 1501B of the support structure. The horizontal distance may be perpendicular to rearward facing direction. The position of the camera 1502 may be defined relative to the center of the outer lens of the camera 1502.

Radar

The side view apparatus may comprise one or more radars 1504. Per FIG. 15, the radar 1504 may be positioned at the lower portion 1501D of the distal end 1501A of the support frame 1501. As seen, the radar 1504 may be positioned distal to the lidar 1503. Alternatively, the radar 1504 may be positioned proximal to the lidar 1503. The radar 1504 may be positioned at the upper portion 1501C of the distal end 1501A of the support frame 1501. The radar 1504 may be directed towards the rear-facing portion of the support frame 1501. As seen in FIG. 15, the radar 1504 is directed about 45 degrees from the vertical medial plane 1510. Alternatively, the radar 1504 may be directed within about 10 degrees to about 170 degrees of the vertical medial plane 1510. The radar 104 may be directed within about 10 degrees to about 170 degrees of the vertical medial plane 1510 about a vertical axis. In some embodiments, the radar 1504 is directed within 90, 80, 70, 60, 50, 40, 30, 20, or 10 degrees of perpendicular to the vertical medial plane 1510, including increments therein. In some embodiments, the radar 1504 is directed within 90 degrees of perpendicular to the vertical medial plane 1510 about a vertical axis. The vertical axis may be parallel or coincident with the medial plane 1510. Further, the radar 1504 may be directed at a pitch of within about 45 degrees of a horizontal plane perpendicular to the medial vertical plane. The radar 1504 may be directed within about 45, 40, 35, 30, 25, 20, 15, 10, or 5 degrees of a horizontal plane, including increments therein. The pitch may be a positive upward directed pitch or a negative downward directed pitch. The radar 1504 may have a viewing angle of about 90, 180, 270, or 360 degrees. The radar 1504 may be positioned about 50 mm to about 650 mm from the proximal end 1501B of the support structure. The position of the radar 1504 may be defined by a point-to-point distance from the proximal end 1501B of the support structure, a horizontal distance from the proximal end 1501B of the support structure, or a vertical distance from the proximal end 1501B of the support structure. The horizontal distance may be perpendicular to rearward facing direction. The position of the radar 1504 may be defined relative to the center of the outer lens of the radar 1504.

Lidar

The side view apparatus may comprise one or more lidars 1503. Per FIG. 15, the lidar 1503 may be positioned at the lower portion 1501D of the distal end 1501A of the support frame 1501. As seen, the lidar 1503 may be positioned proximal to the radar 1504. Alternatively, the lidar 1503 may be positioned distal to the radar 1504. The lidar 1503 may extend beyond the lower portion 1501D of the support structure. The lidar 1503 may be positioned at the upper portion 1501C of the distal end 1501A of the support frame 1501. The lidar 1503 may be positioned about 50 mm to about 650 mm from the proximal end 1501B of the support structure. The position of the lidar 1503 may be defined by a point-to-point distance from the proximal end 1501B of the support structure, a horizontal distance from the proximal end 1501B of the support structure, or a vertical distance from the proximal end 1501B of the support structure. The horizontal distance may be perpendicular to rearward facing direction. The position of the lidar 1503 may be defined relative to the center of rotation of the lidar 1503. Further, the lidar 1503 may be directed at a pitch of within about 45 degrees of a horizontal plane perpendicular to the medial vertical plane. The lidar 1503 may be directed within about 45, 40, 35, 30, 25, 20, 15, 10, or 5 degrees of a horizontal plane, including increments therein. The pitch may be a positive upward directed pitch or a negative downward directed pitch. The lidar 1503 may have a viewing angle of about 90, 180, 270, or 360 degrees.

A lidar 1503 is a distance measuring device. The lidar 1503 may use ultraviolet, visible, or near infrared light to image objects. The lidar 1503 may target a wide range of materials, including non-metallic objects, rocks, rain, chemical compounds, aerosols, clouds, and even single molecules. The lidar 1503 may comprise a narrow laser beam lidar 1503. The lidar 1503 may have a resolution of 30, 25, 20, 15, 10, 5, 4, 3, 2, 1, 0.5 cm or less, including increments therein. The lidar 1503 may have a wavelength of about 10 micrometers to about 250 nanometers. The lidar 1503 may employ any common distance measuring techniques including Rayleigh scattering, Mie scattering, Raman scattering, fluorescence, or any combination thereof In some embodiments, the lidar 1503 comprises a Frequency Modulated Continuous Wave (FMCW) laser. FMCW, also called continuous-wave frequency-modulated (CWFM), is a range measuring technique. FMCW increases distance measurement reliability by additional measuring object speed to account more than one source of reflection. The signal transmitted by the FMCW may have a stable continuous wave frequency which varies over a fixed period of time by a modulating signal, whereby a frequency difference between the receive signal and the transmit signal increases with delay, and hence with distance. Echoes from a target may then be mixed with the transmitted signal to produce a beat signal to blur any Doppler signal and determine distance of the target after demodulation. The modulating signal may comprise a sine wave, a sawtooth wave, a triangle wave, or a square wave.

Inertial Measurement Unit

As illustrated in FIGS. 15 and 16, the side view apparatus may further comprise an inertial measurement unit (IMU) 1506. The IMU 1506 may be attached to the distal end 1501A of the support frame 1501. The IMU 1506 may be attached to the support frame 1501 at a center of mass (inertia) of the side view apparatus. The IMU 1506 may comprise a plurality of sensors, including, but not limited to, a gyroscope, an accelerometer, a level sensor, a pressure sensor, a potentiometer, a wind gauge, and a strain gauge. The IMU 1506 may be configured to measure a position, a rotation, a speed, an acceleration, or any combination thereof of the side view apparatus 1500. The IMU 1506 may be configured to measure a position, a rotation, a speed, an acceleration, or any combination thereof of the side view apparatus 1500, with respect to the autonomous vehicle.

The IMU 1506 may transmit the position, the rotation, the speed, the acceleration, or any combination thereof to the autonomous vehicle.

The data collected by the camera 1502, the radar 1504, the lidar 1503, or any combination thereof may be transmitted to the IMU 1506. The IMU 1506 may transmit the data collected by the camera 1502, the radar 1504, the lidar 1503, or any combination thereof to the autonomous vehicle. The data collected by the camera 1502, the radar 1504, the lidar 1503, or any combination thereof may be transmitted to the autonomous vehicle.

Mirrors

The side view apparatus 1500 may further comprise one or more mirror attachments. The mirror attachment may be on the rear-facing portion of the support frame 1401. The mirror attachment may be configured to receive a mirror assembly 1801. The mirror attachment may comprise a snap, a screw, a bolt, an adhesive, a threaded feature, or any combination thereof. The mirror attachment may be configured to manually or automatically adjust a position of the mirror.

The side view apparatus 1500 may further comprise a mirror assembly 1801. The mirror assembly 1801 may be on the rear-facing portion of the support frame 1501. The mirror assembly 1801 may comprise one or more mirrors. The mirrors may comprise a concave mirror, a planar mirror, or a convex mirror. The mirror may comprise a multi-focal mirror.

Autonomous Vehicles

Figure 17:
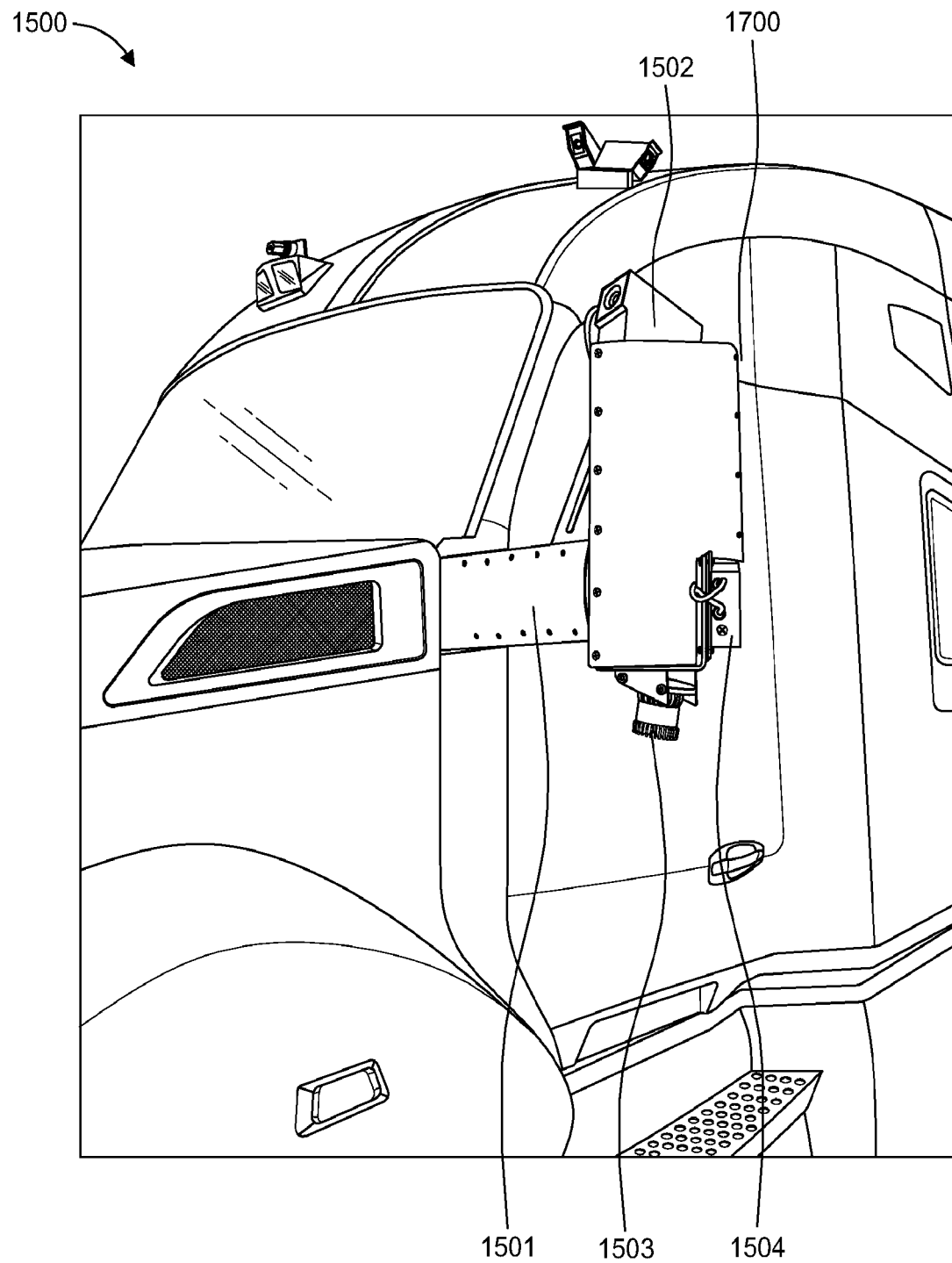
FIG. 17 shows a non-limiting front view photograph of a side view apparatus for an autonomous vehicle according to one aspect of the disclosure.

In some embodiments, per FIG. 17, the autonomous vehicle 1700 comprises a semi-trailer. Alternatively, the autonomous vehicle 1700 comprises a car, a truck, a trailer, a cart, a snowmobile, a tank, a bulldozer, a tractor, a van, a bus, a motorcycle, a scooter, or a steamroller. The autonomous vehicle 1700 may comprise a land vehicle. The autonomous vehicle 1700 may have a forward side, a right side, a left side, and a rear side. The forward side may be defined as the forward, or main, direction of travel of the autonomous vehicle. The right side may be defined from the point of view of the autonomous vehicle 1700, or as 90 degrees clockwise from the forward direction when viewed from above.

A semi-trailer truck, also known as a semi-truck, a semi, a tractor trailer, a big rig or an eighteen-wheeler, is the combination of a tractor unit carriage and one or more semi-trailers that are configured to contain a freight.

An autonomous vehicle 1700, also known as a self-driving vehicle, or driverless vehicle is a vehicle that is capable of sensing its environment and moving with little or no human input. Autonomous vehicles 1700 employ a variety of sensors to perceive their surroundings, whereby advanced control systems interpret sensory information to identify appropriate navigation paths, as well as obstacles and relevant signage. The autonomous vehicles 1700 may comprise a fully autonomous vehicle or a semi-autonomous vehicle 1700.

Sensor System for an Autonomous Vehicle

Figure 18:
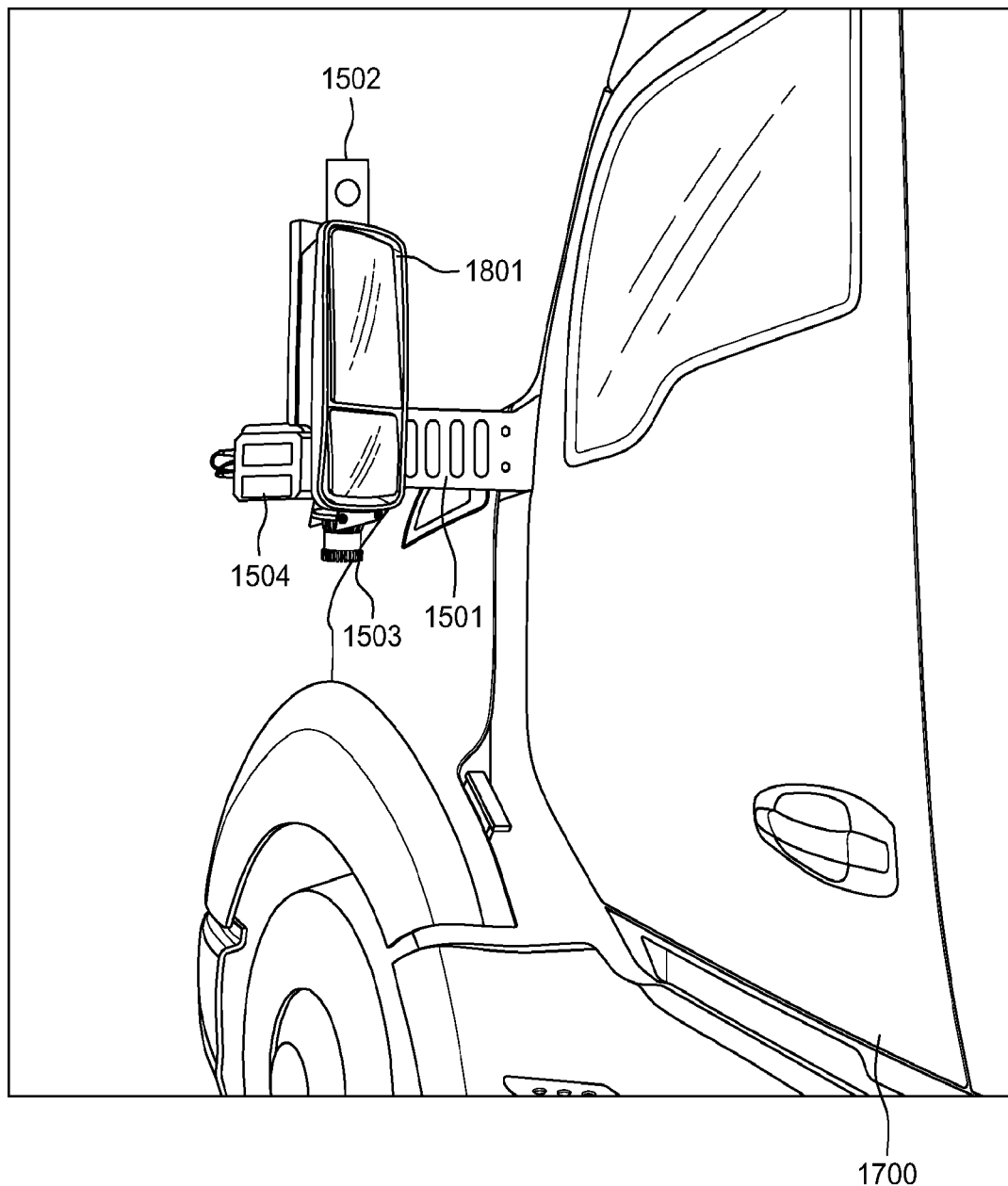
FIG. 18 shows a non-limiting rear view photograph of a side view apparatus for an autonomous vehicle according to one aspect of the disclosure.
Figure 19:
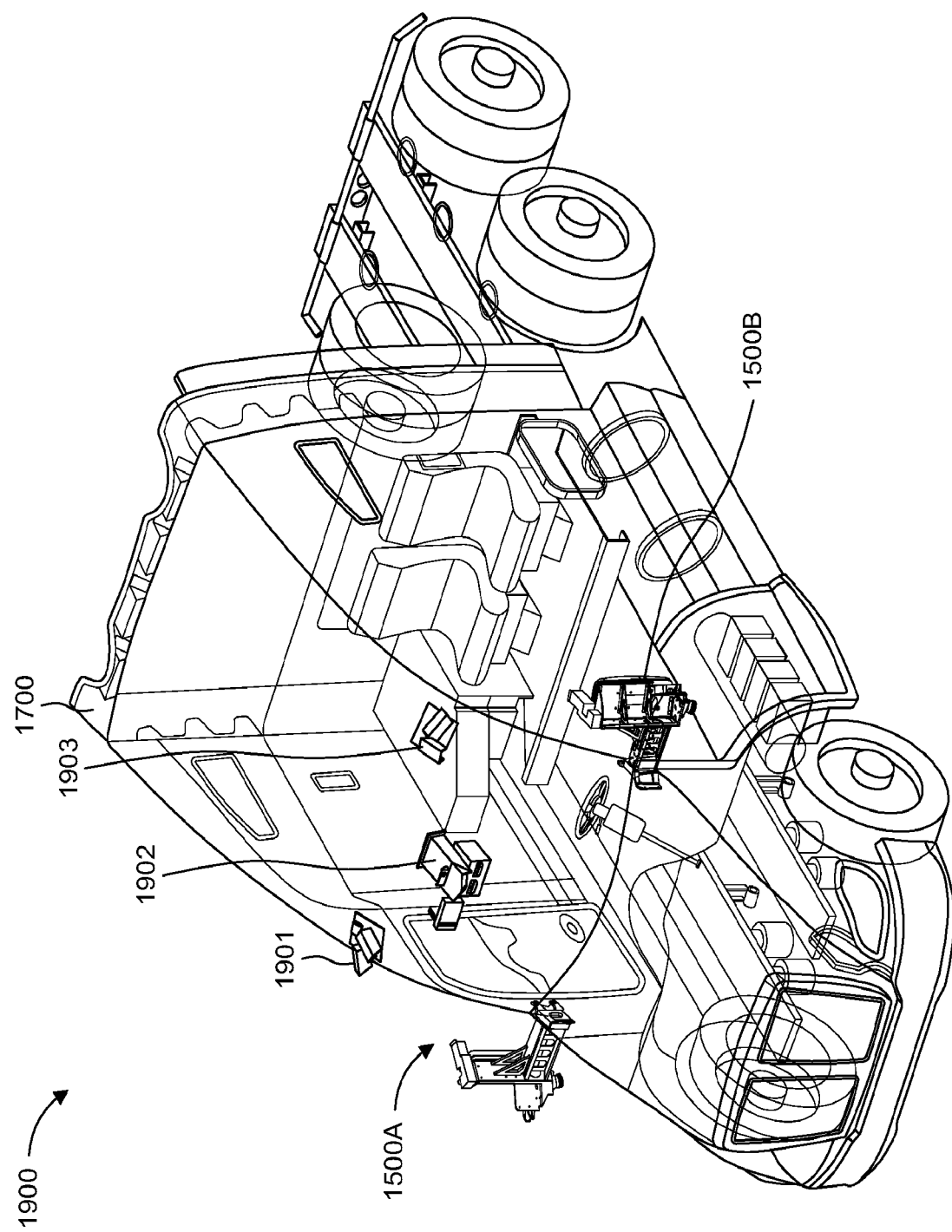
FIG. 19 shows a non-limiting perspective illustration of a sensor system for an autonomous vehicle according to one aspect of the disclosure.

Another aspect provided herein, per FIGS. 18 and 19, is a sensor system 1900 for an autonomous vehicle comprising a left side view apparatus 1500B, a right side view apparatus 1500A, or a left side view apparatus 1500B and a right side view apparatus 1500A and one or more of a left side sensor assembly 1901, a right side sensor assembly 1903, and a top side sensor assembly 1902.

The right side view apparatus 1500A may be configured to couple to the autonomous vehicle. The right side view apparatus 1500A may be configured to couple to the autonomous vehicle via the coupling. The left side view apparatus 1500B may be configured to couple to the autonomous vehicle. The left side view apparatus 1500B may be configured to couple to the autonomous vehicle via the coupling.

The left side sensor assembly 1901 may be configured to mount to left side of the autonomous vehicle. The right side sensor assembly 1903 may be configured to mount to right side of the autonomous vehicle. The top side sensor assembly 1902 may be configured to mount to a roof of the autonomous vehicle. At least one of the left side sensor assembly 1901, the right side sensor assembly 1903, and the top side sensor assembly 1902 may be configured to permanently mount to the autonomous vehicle. At least one of the left side sensor assembly 1901, the right side sensor assembly 1903, and the top side sensor assembly 1902 may be configured to removably mount to the autonomous vehicle. At least one of the left side sensor assembly 1901, the right side sensor assembly 1903, and the top side sensor assembly 1902 may be configured to reduce a parasitic drag when mounted on the autonomous vehicle. The sensor system 1900 may be installed on the autonomous vehicle without requiring a material modification to the autonomous vehicle. The sensor system 1900 may be installed on the autonomous vehicle without preventing access to the vehicle by a human driver. The sensor system 1900 may be installed on the autonomous vehicle without preventing a human driver from operating the autonomous vehicle. The sensor system 1900 may be installed on the autonomous vehicle without significantly precluding the field of vision of a human driver. Such access to a human driver allows more complex loading and unloading maneuvers, precise operation in dangerous or restricted areas, and enables a safety and/or security member to remain within the vehicle with or without operating the vehicle.

Figure 20:
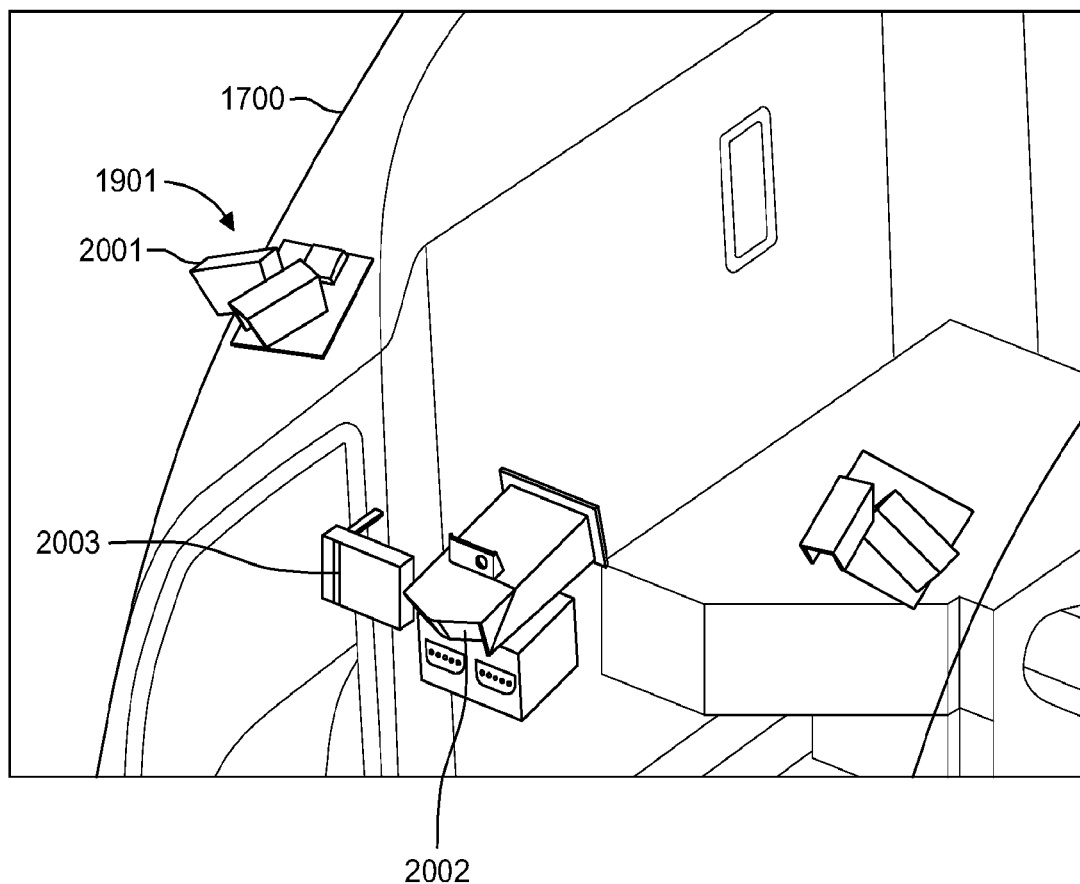
FIG. 20 shows a non-limiting detailed perspective illustration of a sensor system for an autonomous vehicle according to one aspect of the disclosure.

Per FIG. 20, the left side sensor assembly 1901, the right side sensor assembly 1903, and the top side sensor assembly 1902 may comprise one or more of: a vehicle camera 2002, a vehicle lidar 2001, and a vehicle radar 2003. The vehicle camera 2002 may comprise a forward view vehicle camera 2002, a side-forward view vehicle camera, 2002, a side view vehicle camera 2002, a wide field of view camera 2002, a narrow field of view vehicle camera 2002 or any combination thereof. The forward view vehicle camera 2002 may be generally directed towards the forward end of the autonomous vehicle. The side-forward view vehicle camera 2002 may be generally directed at an angle within about 45 degrees from the forward end of the autonomous vehicle. The side view vehicle camera 2002 may be generally directed at a perpendicular angle from the forward end of the autonomous vehicle. The wide field of view camera 2002 may have a focal length of about 15, 14, 13, 12, 11, 10, 9, 8, 7, 6, or 5 mm, including increments therein. The narrow field of view vehicle camera 2002 may have a focal length of about 12, 13, 14, 15, 16, 17, 18, 19, 20, 22, 24, 26, 28, or 30 mm including increments therein.

The sensor system 1900 may further comprise a front bumper sensor assembly, a front window sensor assembly, or both. The front bumper sensor assembly and the front window sensor assembly may comprise a vehicle camera 2002, a vehicle lidar 2001, and a vehicle radar 2003.

In some embodiments, the vehicle lidar 2001 comprises a front view lidar, a side view lidar, or a rear view lidar. In some embodiments, the vehicle radar 2003 comprises a front view radar, a side view radar, or a rear view radar The sensor system 1900 may enable a field of view around the autonomous vehicle of 360 degrees. The sensor system 1900 may enable a field of view around the autonomous vehicle of 360 degrees at a diameter of about 100, 125, 150, 175, 200, 225, 250, 275, 300, 325, 350, 375, 400 meters or more, including increments there. The sensor system 1900 may provide redundant coverage within the field of view of about 10, 20, 30, 40, 50, 60, 70, 80, 90 or more percent, including increments therein.

Retrofit Sensor Kit for an Autonomous Vehicle

Figure 21:
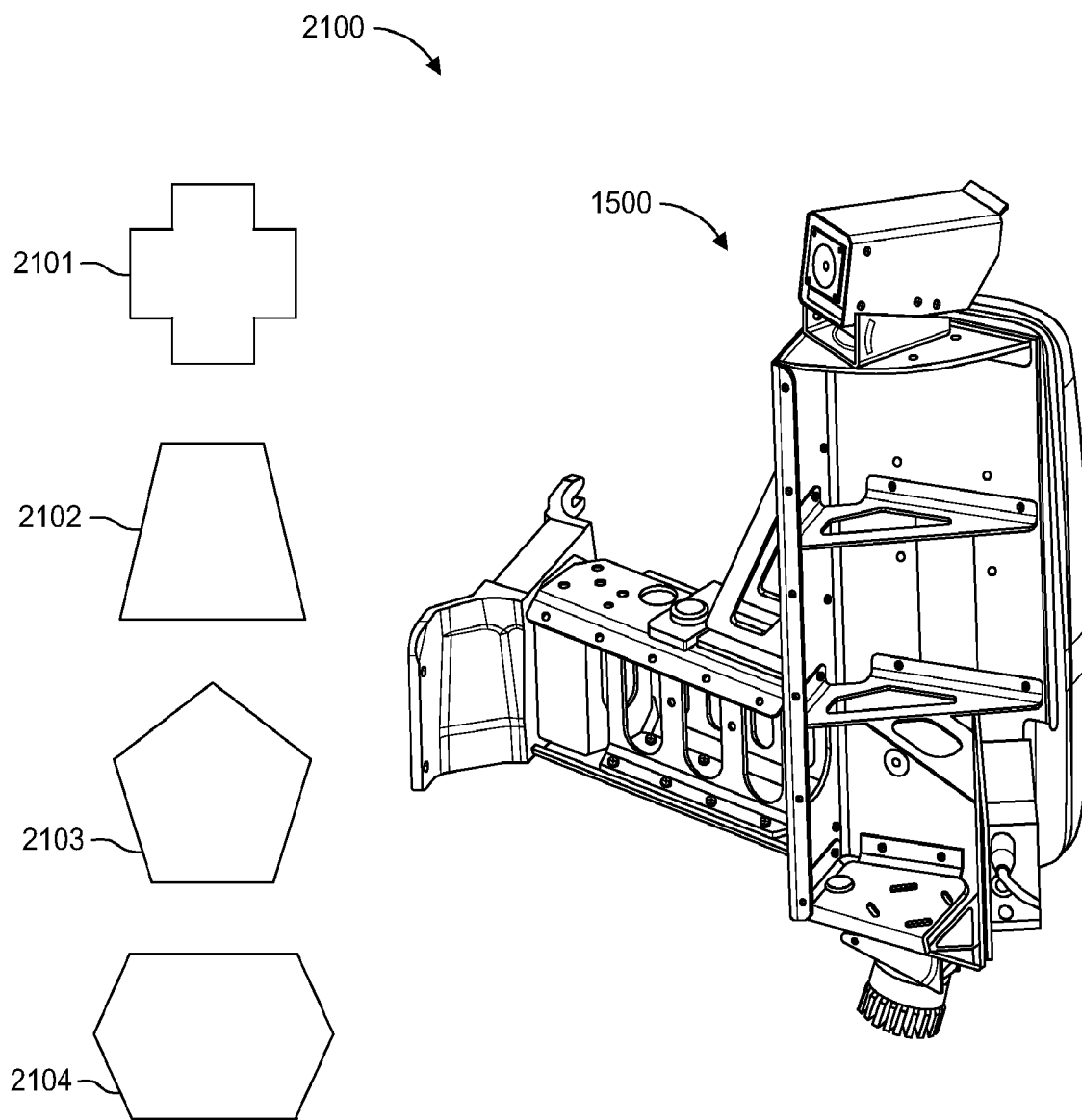
FIG. 21 shows a non-limiting perspective illustration of a retrofit sensor kit for an autonomous vehicle according to one aspect of the disclosure.
Figure 22:
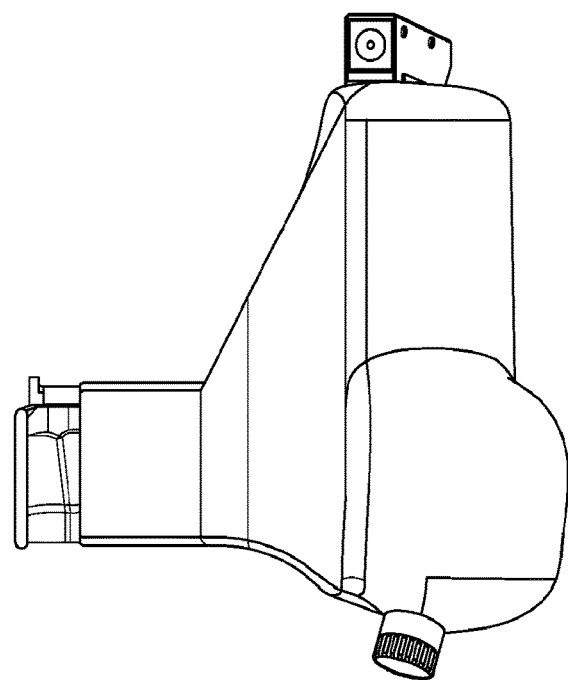
FIG. 22 shows a front elevational view illustration of a side view apparatus (left side/driver side) for an autonomous vehicle according to one aspect of the disclosure.
Figure 23:
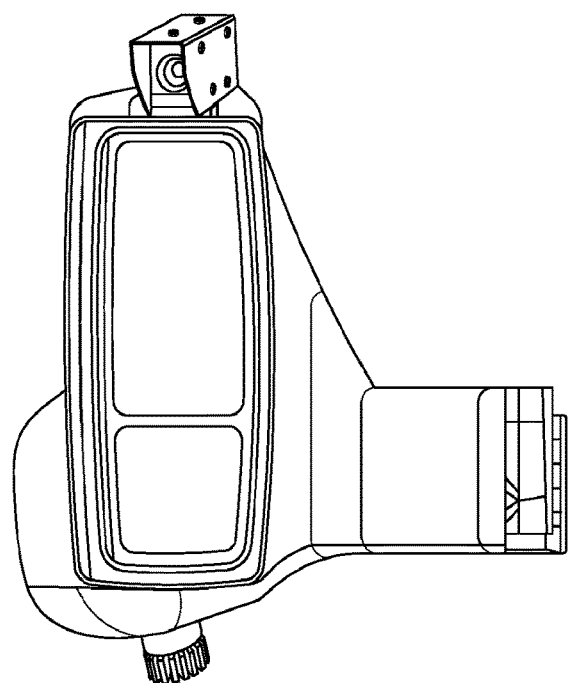
FIG. 23 shows a back elevational view illustration of a side view apparatus for an autonomous vehicle according to one aspect of the disclosure.
Figure 27:
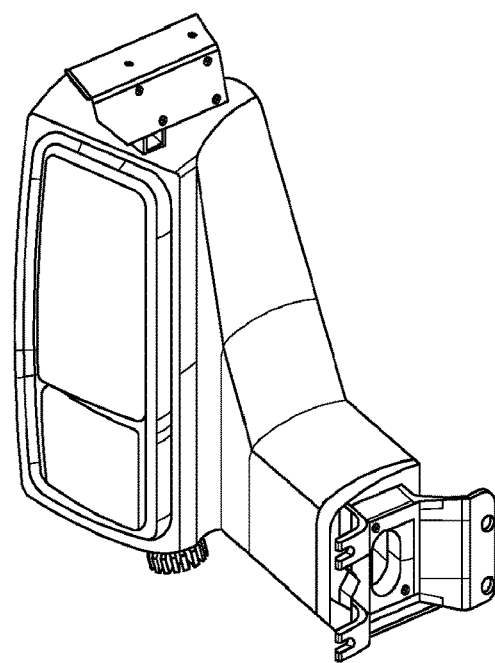
FIG. 27 shows a top back left perspective view illustration of a side view apparatus for an autonomous vehicle according to one aspect of the disclosure.
Figure 28:
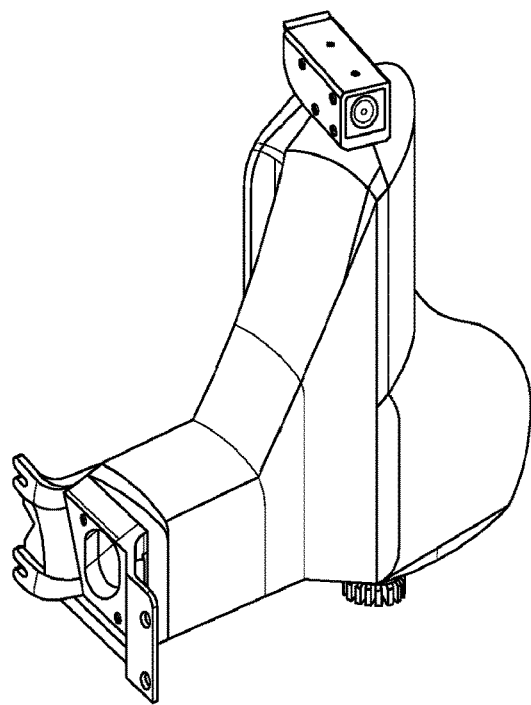
FIG. 28 shows a top front left perspective view illustration of a side view apparatus for an autonomous vehicle according to one aspect of the disclosure.

Another aspect provided herein, per FIG. 21, is a retrofit sensor kit for an autonomous vehicle comprising a side view apparatus 1500, and one or more of: a left side sensor assembly 2102, a right side sensor assembly 2103, and a top side sensor assembly 2104, and a fastener 2101.

The side view apparatus 1500 may comprise a left side view apparatus, a right side view apparatus, or a left side view apparatus and a right side view apparatus.

The fastener 2101 may be configured to attach at least one of the left side view apparatus, the right side view apparatus, the left side sensor assembly, the right side sensor assembly, and the top side sensor assembly to the autonomous vehicle. In some embodiments, the fastener 2101 comprises a screw, a bolt, a nut, an adhesive, a tape, a strap, a tie, a cable, a clamp, or any combination thereof.

As used herein, the term "about" refers to an amount that is near the stated amount by 10%, 5%, or 1%, including increments therein.

EXAMPLES

The following illustrative examples are representative of embodiments of the software applications, systems, and methods described herein and are not meant to be limiting in any way.

Example 1—Camera Field of View

In one example, the sensor system for an autonomous vehicle comprises a left side view apparatus comprising a camera, a left side sensor assembly comprising a side view vehicle camera and a side-forward view vehicle camera, and a top side sensor assembly comprising a forward view vehicle camera.

In this example, each of the cameras (e.g., the forward view vehicle camera, the side-forward view vehicle camera, the side view vehicle camera, and the camera of the left side view apparatus) has a focal length of about 4 mm to 30 mm.

Further, the side-forward view vehicle camera may have a pitch with respect to a horizontal plane of about −10 degrees, the side view vehicle camera may have a pitch of about −25 degrees, and the camera of the left side view apparatus may have a pitch of about −10 degrees.

Example 2—Radar and Lidar Fields of View

In another example, the sensor system for an autonomous vehicle comprises a left side view apparatus comprising a radar and a lidar, and a right side view apparatus comprising a radar and a lidar. The radars and lidars on the left and right side view apparatus enable a 360 degree field of view with a diameter of about 200 meters.

Only exemplary and representative embodiments are described herein and only but a few examples of its versatility are shown and described in the present disclosure. It is to be understood that the present invention is capable of use in various other combinations and environments and is capable of changes or modifications within the scope of the inventive concept as expressed herein.

Although the foregoing description is directed to the preferred embodiments, it is noted that other variations and modifications will be apparent to those skilled in the art, and may be made without departing from the spirit or scope of the invention. Moreover, features described in connection with one embodiment may be used in conjunction with other embodiments, even if not explicitly stated above.

The invention claimed is:

1. A sensor assembly for an autonomous vehicle, comprising:
an arm, the arm extending along an arm longitudinal centerline axis and having a lower portion that is a bottommost portion of the arm;
a housing coupled to the arm, the housing extending at a housing longitudinal centerline axis that is substantially perpendicular to the arm longitudinal centerline axis; and
one or more lidars coupled to the housing,
wherein the arm is configured to support the one or more lidars laterally away from an A-pillar of the autonomous vehicle, and
wherein the housing is configured to support at least one lidar of the one or more lidars vertically below the housing and a hood of the autonomous vehicle such that the one or more lidars are vertically below the lower portion of the arm, wherein the at least one lidar is a rotating lidar having a viewing angle of 360 degrees.

2. The sensor assembly of claim 1, wherein at least one other lidar of the one or more lidars has a viewing angle of about 90 degrees, 180 degrees, 270 degrees, or 360 degrees.

3. The sensor assembly of claim 1, wherein the at least one lidar of the one or more lidars is coupled to a lowermost surface of the housing.

4. The sensor assembly of claim 1, wherein the at least one lidar of the one or more lidars extends vertically below a lowermost surface of the arm.

5. The sensor assembly of claim 1, further comprising a side view mirror coupled to a rear facing side of the housing.

6. The sensor assembly of claim 5, further comprising a second mirror coupled to the rear facing side of the housing below the side view mirror, the second mirror having a convex mirrored surface.

7. The sensor assembly of claim 6, wherein the housing, the one or more lidars, the arm, the side view mirror, and the second mirror form a side mirror assembly configured to be coupled to the A-pillar of the autonomous vehicle.

8. The sensor assembly of claim 1, wherein the at least one lidar is positioned at a lower portion of the housing and at least one other lidar of the one or more lidars is positioned at an upper portion of the housing.

9. The sensor assembly of claim 1, further comprising one or more cameras coupled to the housing.

10. The sensor assembly of claim 9, wherein at least one camera of the one or more cameras are coupled to an upper portion of the housing.

11. The sensor assembly of claim 9, wherein at least one camera of the one or more cameras is coupled to an opposing surface from at least one lidar of the one or more lidars.

12. The sensor assembly of claim 9, wherein the one or more cameras comprises at least two cameras coupled to the housing such that the at least two cameras having a portion of each field of view in opposing directions.

13. The sensor assembly of claim 12, further comprising one or more radars or a thermal camera.

14. The sensor assembly of claim 13, wherein the one or more lidars comprise two or more lidars or the one or more radars comprises two or more radars.

15. The sensor assembly of claim 9, wherein the one or more cameras comprises at least two cameras coupled to the housing such that the at least two cameras having a portion of each field of view in substantially perpendicular directions.

16. The sensor assembly of claim 15, further comprising one or more radars or a thermal camera.

17. The sensor assembly of claim 16, wherein the one or more lidars comprise two or more lidars or the one or more radars comprises two or more radars.

18. The sensor assembly of claim 1, further comprising one or more radars.

19. The sensor assembly of claim 18, wherein the one or more lidars comprise two or more lidars or the one or more radars comprises two or more radars.

20. The sensor assembly of claim 18, further comprising one or more cameras.

21. The sensor assembly of claim 20, wherein the one or more cameras comprises at least two cameras coupled to the housing such that the at least two cameras having a field of view in opposing directions.

22. The sensor assembly of claim 20, wherein the one or more cameras comprises at least two cameras coupled to the housing such that the at least two cameras having a portion of each field of view in substantially perpendicular directions.

23. The sensor assembly of claim 1, further comprising one or more radars, a thermal camera, a first camera having a field of view including a direction opposite of a direction of travel, a second camera having a field of view including the direction of travel, a third camera having a field of view including a direction perpendicular to the direction of travel.

24. The sensor assembly of claim 23, wherein the second camera is a wide field of view camera.

25. The sensor assembly of claim 23, wherein the second camera is a narrow field of view camera.

26. An autonomous vehicle comprising:
the sensor assembly of claim 1;
the A-pillar; and
the hood,
wherein the at least one lidar of the one or more lidars extends a first predetermined distance laterally away from the autonomous vehicle and a second predetermined distance vertically below the hood.

27. An autonomous vehicle comprising:
two or more sensor assemblies according to claim 1;
the A-pillar; and
the hood,
wherein a first sensor assembly of the two or more sensor assemblies is coupled to a left side of the autonomous vehicle and a second sensor assembly of the two or more sensor assemblies is coupled to a right side of the autonomous vehicle,
wherein each of the first sensor assembly and the second sensor assembly extend laterally away from the left side and the right side, respectively, of the autonomous vehicle, and
wherein the at least one lidar of the one or more lidars of each of the first sensor assembly and the second sensor assembly extend vertically below the hood.

28. The sensor assembly of claim 5, further comprising one or more sensors extending vertically above the side view mirror.

* * * * *